United States Patent [19]

Fullerton et al.

[11] 4,085,041
[45] Apr. 18, 1978

[54] BIOLOGICAL OXIDATION AND FLOTATION APPARATUS AND METHOD

[75] Inventors: Donald Griswold Fullerton, Denver; Gilbert Mowder Kyrias, Littleton; Richard Baxter Weber, Denver, all of Colo.

[73] Assignee: FMC Corporation, Chicago, Ill.

[21] Appl. No.: 678,162

[22] Filed: Apr. 19, 1976

Related U.S. Application Data

[63] Continuation of Ser. No. 535,133, Dec. 20, 1974, abandoned.

[51] Int. Cl.$^2$ .............................................. C02C 1/08
[52] U.S. Cl. .......................................... 210/7; 210/13; 210/44
[58] Field of Search ............... 209/170; 210/4, 5, 7, 210/10, 13, 15, 44, 63 R, 220, 221 P, 221 M, 513, 537, 542, 219, 195 S; 261/122, 124, DIG. 75

[56] References Cited

U.S. PATENT DOCUMENTS

| | | | |
|---|---|---|---|
| 2,212,841 | 8/1940 | Maxwell | 210/220 X |
| 2,948,677 | 8/1960 | Austin et al. | 210/220 X |
| 3,149,071 | 9/1964 | Burgoon et al. | 210/220 X |
| 3,224,964 | 12/1965 | Derenk et al. | 210/221 X |
| 3,275,149 | 9/1966 | Ludwig et al. | 210/220 X |
| 3,711,072 | 1/1973 | Waldenville | 261/122 |
| 3,769,163 | 10/1973 | Brumfield | 261/122 X |
| 3,956,432 | 5/1976 | Hilling | 261/122 X |

*Primary Examiner*—Charles N. Hart
*Assistant Examiner*—Robert H. Spitzer
*Attorney, Agent, or Firm*—Dressler, Goldsmith, Clement, Gordon & Shore, Ltd.

[57] ABSTRACT

Biological oxidation and flotation apparatus and method are disclosed for use in the treatment of sewage or other aqueous waste material by the activated sludge process. A treatment and flotation chamber is provided in which both biological oxidation and flotation take place. In some forms of the method and apparatus, a separate biological oxidation tank is also used prior to the treatment and flotation chamber.

The treatment and flotation chamber includes a quiescent zone at the top of the chamber that extends horizontally through at least the downstream part of the chamber, and extends downward at least about three inches blow the surface of the contents of the chamber. The contents of the chamber below the quiescent zone are continuously recirculated, for example by pumps whose inlets lie below the quiescent zone and which transfer a part of the aqueous material under treatment to the bottom of the chamber to be employed as the shearing liquid in a bubble shearing apparatus. The entire contents of any part of the treatment and flotation chamber over which the quiescent zone does not extend are also continuously recirculated, as are the entire contents of any separate biological oxidation tank.

Oxygen-containing gas bubbles are introduced into the system to provide oxygen for biological treatment of the aqueous material in any separate biological oxidation tank and in the treatment and flotation chamber, and to provide bubbles (supplemented by carbon dioxide and nitrogen, absorbed from the liquid medium) which attach themselves to suspended solid particles to form a float in the quiescent zone at the top of the treatment and flotation chamber. Substantially all of the oxygen-containing gas bubbles introduced below the quiescent zone in the treatment and flotation chamber are no larger than about 500 microns in diameter, with the bubble size measured under certain specified conditions. A maximum bubble size of about 200 microns produces improved results, 100 microns produces still better results, and a 50 micron maximum bubble diameter is preferred.

The oxygen-containing bubbles are introduced into the treatment and flotation chamber from gas in the free state, at a pressure, measured adjacent the outlet orifices of the bubble forming devices employed, that is approximately equal to the hydrostatic pressure of the liquid at that point.

81 Claims, 14 Drawing Figures

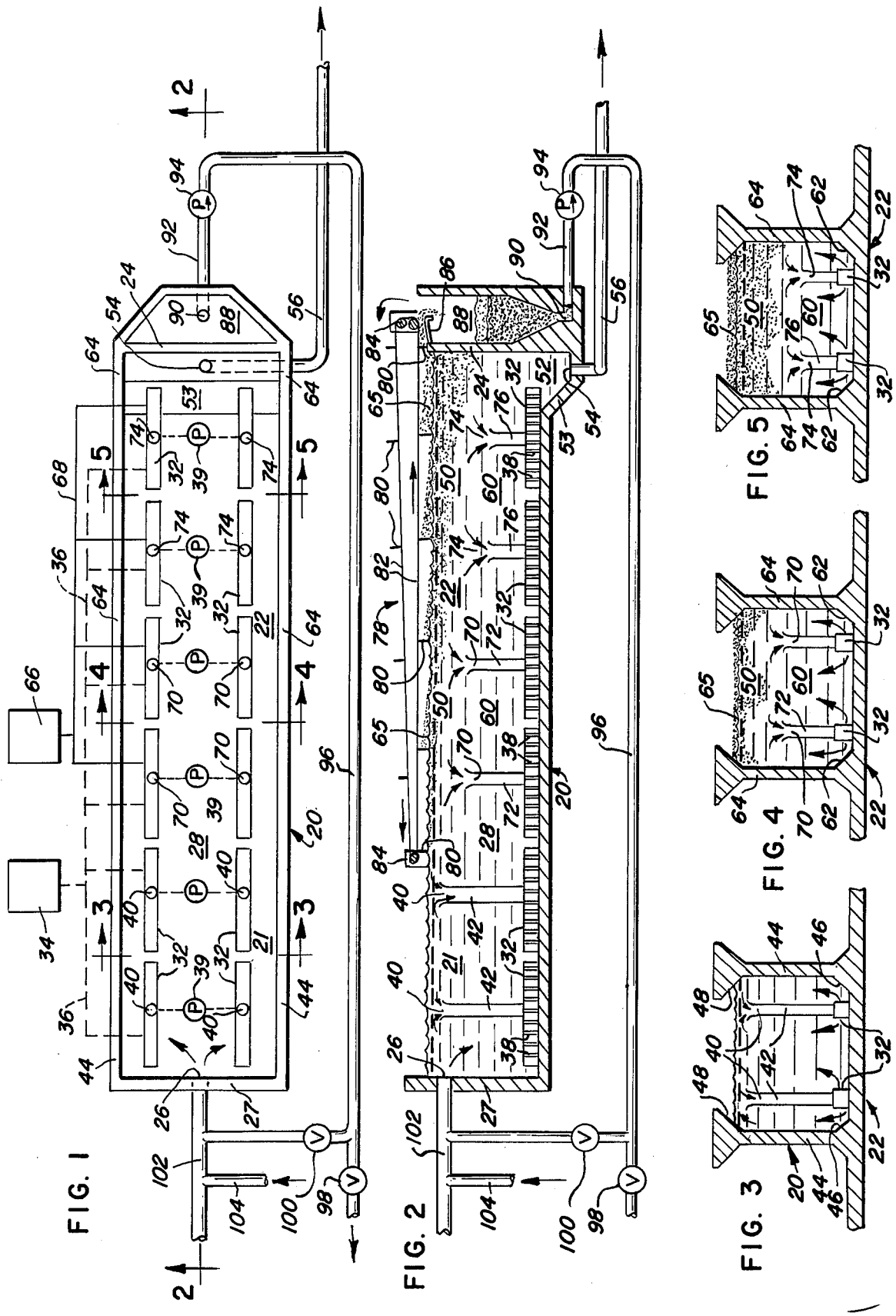

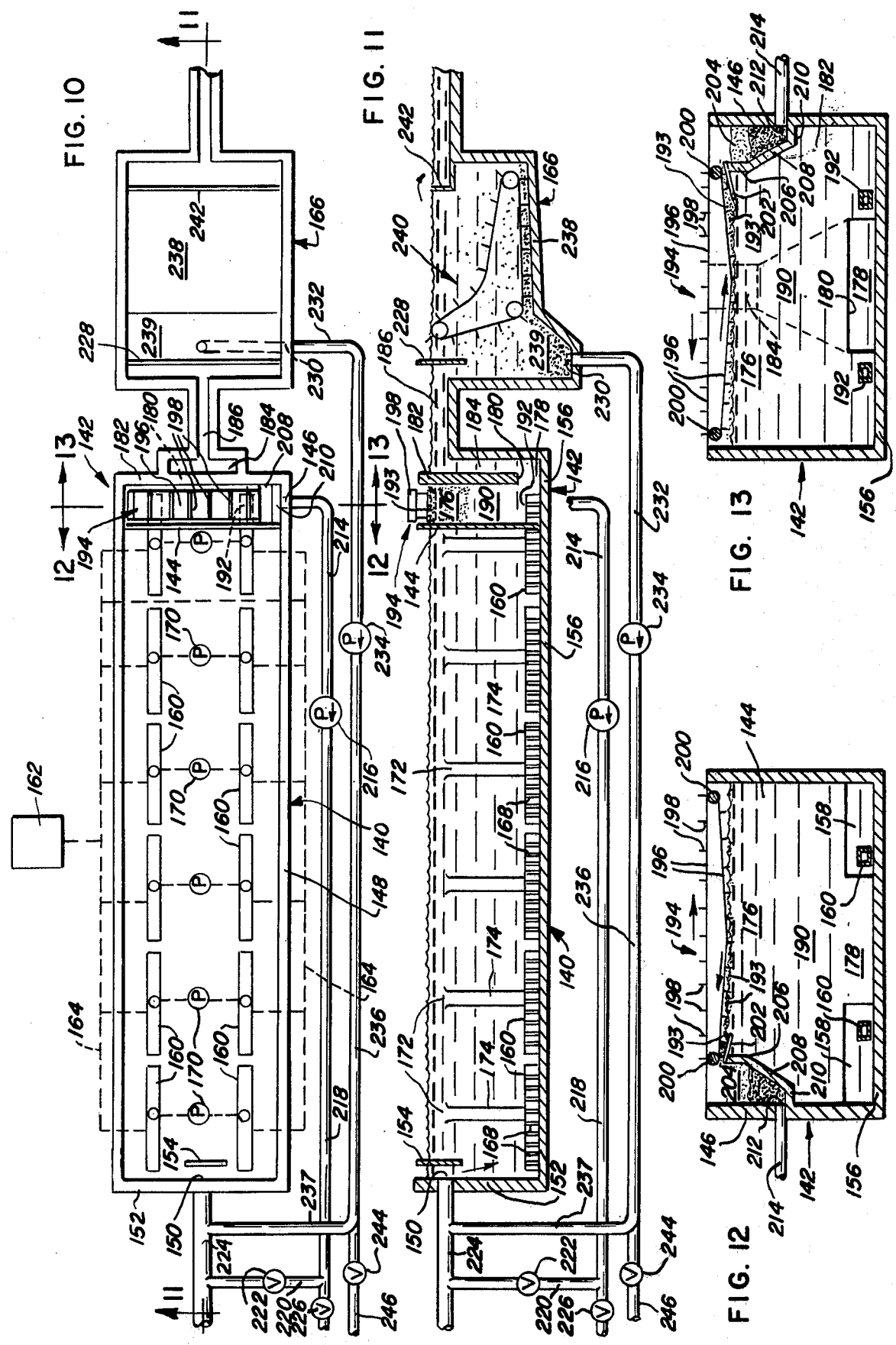

BIOLOGICAL OXIDATION AND FLOTATION APPARATUS AND METHOD

This is a continuation of application Ser. No. 535,133, filed Dec. 20, 1974, now abandoned.

This invention relates to apparatus and method for carrying out biological oxidation and flotation steps in the treatment of aqueous waste material, such as sewage, by the activated sludge process.

BACKGROUND OF THE INVENTION

In the conventional "activated sludge" process for the treatment of sewage, an aeration tank of substantial size is followed by a large settling tank. The material being treated is aerated in the first tank for a period of time sufficient to achieve, through the action of oxygen and biological life such as aerobic bacteria and protozoa, desired biochemical removal of organic waste. In the settling tank, as its name indicates, sludge settles to the lower portion of the tank and a relatively clear effluent rises to the top.

Sewage or other aqueous waste material containing solid particles suspended therein is introduced at the inlet of the aeration tank where, together with activated sludge that has been returned to the tank in the start-up phase of the continuous process, it forms "mixed liquor." Mixed liquor contains not only aqueous waste material but also an active "biomass" that has been in contact with the aqueous waste material in the presence of oxygen for respiration. After it has remained in the aeration tank for a period of time, mixed liquor is continuously withdrawn from the outlet of the tank and delivered to the settling tank.

In the settling tank, a substantial portion of the suspended solids settles out as sludge (including as its volatile portion the biomass referred to above), and is withdrawn, to be either returned to the aeration tank as "activated sludge" or wasted as excess. The clarified supernatant liquid is drawn off from the top of the settling tank and discharged as secondary effluent.

The ultimate products of the activated sludge process of sewage treatment are carbon dioxide, water, synthesized biomass or synthesized cell material, and minor amounts of nitrogen. The purpose of the settling tank is to provide settled activated sludge containing aerobic biological life (such as bacteria and protozoa) for return to the aeration tank in order to give the biological life repeated opportunities to metabolize the organic waste. Other material on which the aerobic bacteria and other biological life can feed, including synthesized cell material and soluble organic matter, is also returned from the settling tank to the aeration tank as part of the activated sludge.

In order to promote the biochemical removal of organic waste by aerobic bacteria and other biological life as just described, it is necessary to provide sufficient oxygen to support the aerobic biological activity. To this end, in the aeration stage of the typical activated sludge process of sewage treatment, bubbles of air, usually of a diameter of about 1 to 2 mm. or larger, are introduced into the mixed liquor in the aeration tank. Conventionally, this is accomplished through the use of mechanical aerators to spray the liquid into contact with the air above the surface of the body of liquid, or through the use of spargers or porous media air diffusers below the surface to bubble air up through the body of liquid.

The introduction of such bubbles sometimes produces a foam or froth of intermixed air bubbles and largely untreated solid particles, which rises to the top of the aeration tank, usually at or near the front end thereof. This result has been considered to be very undesirable, and every effort has been made to avoid the formation of foam or froth containing untreated solids as described, because the two purposes of the aeration tank have been (1) to achieve thorough and extended mixing between the suspended solids and the gas bubbles or the dissolved gas, and (2) to deliver a suspension of treated solids to the settling tank for removal of those solids there through the settling process. Thus, water sprays have often been used to combat foaming in the aeration tank by collapsing any foam or froth formed on the surface of the material in the tank, in order to cause the primarily untreated sludge to resubmerge in the aqueous medium in the aeration tank for further treatment there.

Another undesirable form in which solid material may rise to the surface of a sewage treatment tank is the floated sludge, or "float," that is sometimes produced in an improperly operated settling tank. If the sludge that has settled in the settling tank is left too long on the bottom of the tank, it becomes anaerobic through the formation of carbon dioxide, methane, and other gases. Bubbles of these gases attach themselves to some of the solid particles of the sludge, and cause the particles to rise to the top of the settling tank. When this happens, the resulting float must be skimmed off the contents of the settling tank in order that it will not pass out from the tank as a part of the plant effluent.

Special flotation tanks have sometimes been employed in sewage treatment installations, but only after — not before — the aqueous material under treatment has passed through a settling tank. Such special flotation tanks are located in the waste sludge line through which a portion of the settled activated sludge that has been removed from the settling tank is discharged instead of being returned for introduction into the aeration tank. The float removed from the top of such a special flotation tank in the waste sludge line has a higher percentage of solid matter (usually about 4 percent by weight), than the settled sludge withdrawn from the settling tank (which may be up to about 2 percent by weight), and thus is more suitable for disposal as waste. This more concentrated sludge is sometimes further concentrated, as for example by use of a vacuum filter, to something like 15 to 20 percent by weight for its ultimate disposal.

These percentages are achieved in most instances through the addition of suitable polymers to encourage the agglomeration of the suspended solids to form larger and more easily floated floc particles. In the vacuum filtration process of final concentration of waste sludge, dewatering agents (such as ferric chloride and lime) are also commonly added to assist in the formation of a denser filter cake.

In special flotation tanks that follow the settling tank as just described, it has been common to introduce air bubbles either by a "dissolved air flotation" technique or by a "dispersed air flotation" technique. U.S. Pat. Nos. 3,063,938 and 3,525,437 disclose examples of the first of these techniques used in a sewage treatment process. U.S. Pat. Nos. 1,985,153, 2,055,065 and 2,246,559 disclose examples of the second technique, used in the patents in question in an ore flotation process.

In the dissolved air flotation technique, pressurized liquid with air dissolved therein (usually under a pressure of about 40 to 60 p.s.i.g.) is introduced into the activated sludge as it is pumped from the settling tank to the special flotation tank. When the liquid medium thus formed is released into the contents of the flotation tank at some location below the surface of those contents, where it is ordinarily subjected to only somewhat more than zero gauge pressure (i.e., somewhat more than one atmosphere absolute pressure), the dissolved air comes out of solution in the form of tiny bubbles, usually about 50 to 100 microns in diameter, which attach themselves to some of the solid particles and cause a float to rise to the top of the tank. In this system, the pressurized liquid in which air is dissolved is typically the effluent from the special flotation tank itself, and in order to provide a sufficient quantity of gas bubbles to produce a flotation effect of significant magnitude, the effluent must be recycled in an amount equivalent to 100 percent or more of the input into the flotation tank. This recycling of the flotation tank effluent necessarily requires additional tank and pumping capacity.

In one form of the dispersed air flotation technique, air may be introduced into the suction side of a pump that directs a part of the activated sludge from the settling tank to a special flotation tank. When this liquid containing added air undergoes a typical cavitation effect in the line from the pump, small air bubbles, ordinarily about 1 mm. in diameter, will be introduced into the special flotation tank and form a float with some of the suspended solids, which float then rises to the top of the tank. In other types of dispersed air equipment (exemplified by the three patents referred to above), air is introduced into an aqueous suspension of solid particles and dispersed throughout the liquid medium by the beating action of various shaped impellers, resulting again in bubbles that are about 1 mm. in diameter.

Whether it is the dissolved air flotation or the dispersed air flotation technique that is used with a known flotation tank of the type that follows the settling tank, substantially all the air bubbles introduced into the contents of the tank operate to raise suspended solids to the surface of the tank, and only a negligible proportion of the oxygen in the bubbles is available for additional biological oxidation of the activated sludge that is introduced into the flotation tank from the settling tank. The particular physical limitations of these two techniques that produce this result will be discussed below.

ADVANTAGES OF THIS INVENTION

Contrary to the teaching of the prior art relating to the activated sludge process of sewage treatment, the present invention deliberately seeks the formation of floated sludge or "float" before — instead of after — the settling tank is reached.

The activated sludge removed from the mixed liquor by a flotation technique in the practice of this invention reduces the amount of activated sludge that must be settled out in the settling tank for wasting. Even more important, the solids that are removed by flotation are by and large the more easily floated solids, which leaves the denser, and thus more quickly settled, solids suspended in the mixed liquor that is transferred to the settling tank. It is believed that because of these results, the settling tank in at least some cases can be smaller in size than in conventional installations, with accompanying savings in the cost of construction of that tank. Or, if the same size settling tank is used, as for example in an existing installation, the rate of flow through the tank can be increased.

Another advantage of the present invention is the high solids concentration of the float produced by use of the invention, which is important because of the resulting lower cost of disposal of the total solid wastes remaining after the final treatment of the sewage by the plant as a whole. The floated sludge that is removed from typical aqueous waste material treated by use of the method and apparatus of this invention usually falls within the range from about 4 to 10 percent solids by weight, with a typical solids concentration for float resulting from the use of this invention being about 6 to 8 percent by weight. This is several times more concentrated than the activated sludge from a conventional settling tank, which may be about 2 percent solids by weight, and it is even more concentrated than the float from the special flotation tanks that follow the settling tank as described above, which is usually only about 4 or 5 percent by weight.

The high solids concentration of the floated sludge resulting from use of the present invention is achieved without the addition of any polymers to promote the formation of larger floc particles, which as explained above is usually necessary in known special flotation tanks. In addition, the floated sludge resulting from use of this invention has been found to have excellent dewaterability characteristics, and filter cakes in the range of about 17–20 percent solids by weight can be produced using only minimal quantities of the conventional dewatering chemicals mentioned above. These facts result in quite considerable savings in the over-all cost of treating aqueous waste material by use of the method and apparatus of this invention.

The method and apparatus of the present invention have at least two very significant additional advantages over the prior activated sludge systems described above in which special flotation tanks are used for treatment of the settled activated sludge after the sludge has been removed from the floor of the settling tank. This is true whether the present invention is compared with the dissolved air or the dispersed air technique.

First, in the preferred form of this invention there is a very great saving in space because in this form the invention stresses the doubling up of functions — that is, biological oxidation and flotation at one and the same time — in a single tank or chamber, and thus no extra space is required at all for a separate, special flotation tank. Even when this invention is practiced with a biological oxidation tank that is followed by a separate treatment and flotation chamber, there is still a marked saving in space because the latter chamber need be no more than a small fraction of the size of known separate flotation tanks that follow instead of precede the settling tank. And in neither of these cases is there any need with the present invention for the extra pumping and tank capacity that is required for the recycling of effluent in order to achieve flotation with the known dissolved air technique.

Second, the oxygen-containing bubbles of this invention can be introduced in such quantities that substantial biological oxidation occurs at the same time that floated sludge is caused to rise to the surface of the contents of the treatment and flotation chamber. This is not possible with the conventional aeration tank, or with the dispersed air flotation technique in a separate flotation tank after the settling tank, because of the turbulence that would result from large bubble size, high bubble velocity, or both, if an attempt was made to introduce quantities of gas sufficient to accomplish both treatment and flotation in existing equipment. It would also not be possible with the dissolved air flotation technique in a separate flotation tank, for a very much larger quantity of oxygen-containing bubbles would have to be introduced into the body of liquid being treated than if only flotation was the goal, and it is believed that recycling of up to 200 or 300 percent, or even more, of the input into such a tank would be required in order to accommodate the necessary amount of additional dissolved gas. This would either require added tank capacity or, in an existing installation, would result in such great turbulence because of the high rate of liquid inflow that successful flotation would be impossible.

SUMMARY OF THE INVENTION

Simultaneous Treatment and Flotation

In the preferred form of the method and apparatus of this invention, the steps of (1) biological oxidation of the aqueous waste material and (2) the removal of suspended solids by flotation are carried out in a single "treatment and flotation chamber." In this preferred form of the invention, the flotation function may be carried out only in the downstream part of the combined treatment and flotation chamber, or if desired it may be carried out across the entire surface of the contents of the chamber.

The treatment and flotation chamber has at least one inlet through which aqueous waste material and return activated sludge can be introduced into the chamber and at least one outlet, spaced from the inlet or inlets, through which mixed liquor can flow from the chamber. An inlet and outlet may typically be at opposite ends of a rectangular chamber. Or, if desired, aqueous waste material and return activated sludge may be introduced through an extended inlet located along each side of a rectangular chamber, with mixed liquor flowing from outlets located at each end of the chamber. In still other embodiments, the inlet and outlet may be located in various positions spaced around the perimeter of a circular chamber. Whatever the shape of the chamber, the inlet and outlet locations, and local deviations from straight line flow, the liquid contents of the chamber will have a mean inlet-to-outlet flow in the downstream direction along one or more paths through the chamber. In other words, one part of the contents of the chamber will exhibit a mean downstream flow from each inlet to an outlet.

This invention can also be practiced by carrying out the first of the above mentioned steps in a separate "biological oxidation tank," and the flotation step in a second chamber. The second chamber is still referred to as a "treatment and flotation chamber," however, since some biological oxidation or treatment must still take place (although at a reduced rate of activity) in this second chamber. In other words, even when a separate biological oxidation tank and a second chamber from which a float is withdrawn are used, the method and apparatus of this invention rely on simultaneous treatment and flotation in the second chamber.

Maximum Bubble Size and Production from Gas in Free State Permit Establishment of Quiescent Zone Whether there is a single chamber or there is in addition a separate biological oxidation tank, the use of a flotation technique before instead of after a settling step is made possible by the discovery that a desirable combination of biological oxidation and flotation can be effected by introducing into the mixed liquor in the treatment and flotation chamber oxygen-containing gas bubbles no larger than about 500 microns in diameter (measured as explained below), the bubbles being produced directly from gas in the free state without first dissolving the gas in a liquid medium (as in the known dissolved air technique) to be introduced thereafter into the material being treated in a dissolved state.

This feature makes the oxygen-containing bubbles employed in the practice of this invention small (no larger than about one-eighth the volume of the bubbles introduced into a conventional aeration tank or introduced by the dispersed air technique into a separate flotation tank after the settling tank), and the degree of turbulence resulting from their introduction quite low (for example, very much lower, as already explained above, than the turbulence that would result if an attempt was made to achieve both flotation and a significant amount of biochemical oxidation in an existing installation by use of the dissolved air technique). The turbulence resulting from use of the apparatus and method of this invention is sufficiently low that the liquid movement accompanying the introduction of the bubbles — though it helps create adequate recirculation of the chamber contents in the lower portion of the chamber — permits at the same time the establishment of a quiescent zone in the upper portion of the treatment and flotation chamber extending down at least about three inches below the level to which the chamber is filled with mixed liquor during normal operation thereof.

The term "quiescent" is used in this specification and claims in the conventional sense in which the term is used in the sewage treatment field, to mean nonagitated and nonturbulent, but not necessarily entirely quiet. According to this meaning, a quiescent zone may include, for example, gentle flow, slow swirling currents, or similar nonagitated movement of the liquid and the solids suspended therein.

Treated, floated solids, which are caused to rise to the surface of the liquid by bubbles adsorbed by the solid particles, accumulate and are concentrated in this upper quiescent zone, and can be withdrawn therefrom as desired. In the meantime, biological oxidation can proceed in the mixed liquor throughout a recirculation zone located below the floated solids in the quiescent zone. All of this is achieved with a minimum amount of equipment and tank capacity.

Improved results are obtained with the method and apparatus of this invention if substantially all the oxygen-containing bubbles introduced into the material below the quiescent zone in the treatment and flotation chamber are no larger than about 200 microns in diameter at the point of their introduction into the body of liquid. Still better results are obtained if substantially all the bubbles are no larger than about 100 microns in diameter, and for best results, they should be no more than about 50 microns. Whatever the bubble size, substantially all the bubbles should preferably fall in a range in which the largest bubbles have a diameter of no more than about 10 times the diameter of the smallest bubbles.

The bubble sizes just specified also have the indicated effects in connection with the introduction of oxygen-containing gas bubbles into any material upstream of the quiescent zone in the treatment and flotation chamber, or into the material in any separate biological oxidation tank.

For the purposes of this invention, all bubble sizes are measured in a special manner that will now be explained.

Measurement of Bubble Size for Particular Aqueous Materials

The size of the bubbles produced by a given gas diffusing apparatus may depend to a significant extent upon the viscosity and surface tension of the liquid into which the gas is introduced, as well as the quantity and type of any surfactants that are present in the liquid. Since sewage is by its nature opaque, the size of gas bubbles present in sewage or mixed liquor derived from sewage cannot ordinarily be reliably estimated. On the other hand, the use of clear water as a test liquid might affect the bubble size produced by a particular gas diffusing apparatus because of the various factors mentioned just above. For these reasons, the size of oxygen-containing bubbles for the apparatus of this invention is specified for "standard simulated sewage."

The term "standard simulated sewage" is used in this specification and claims to refer to a test liquid that is formulated so that its relevant physical characteristics simulate with a reasonable degree of accuracy the corresponding characteristics of the mixed liquor that flows out of a conventional aeration tank in a typical sewage treatment plant. The simulated sewage referred to is formulated by the introduction into water of materials that will dissolve or become suspended to produce a relatively clear or translucent aqueous material in which bubble size can be reliably measured. These materials may include, for example, (1) a substance such as carboxy methyl cellulose or some similar water soluble material, and (2) household detergents or other surfactants, all of these materials being added to water in amounts sufficient to produce a viscosity in the resulting liquid of about 1 centipoise, a surface tension of about 40 to 50 dynes/cm., and a surfactant concentration of about 0.7 mg./liter.

The determination of gas bubble size presents a similar problem when a particular method of activated sludge sewage treatment is being analyzed as when apparatus is being considered. In defining the method of this invention or in ascertaining whether the method is in fact being used in a given situation, the size of the gas bubbles employed may be determined with reasonable reliability only if the mixed liquor into which the bubbles are introduced is relatively clear or translucent. Thus, with aqueous waste material such as sewage, which is opaque, the determination of bubble size for the method of this invention should be made with all the other process parameters and conditions the same as are employed in the method in question, but with a "duplicate simulated sewage" as the material being treated. The term "duplicate simulated sewage" refers to aqueous material that is relatively clear or translucent, and has substantially the same viscosity, surface tension, concentration of surfactants, and other physical characteristics as the mixed liquor that is actually being treated by the particular method in question.

Measurement of Bubble Size for Particular Gas Flow Rates

The size of the bubbles produced by a given diffusing apparatus may also be affected by the gas flow rate through the apparatus, with an increased gas flow rate tending to produce larger bubbles with certain types of diffusing apparatus.

A typical gas flow rate when gas diffusing apparatus is used in the practice of this invention that includes a gas transmitting body having a labyrinthine network of gas transmitting passages therethrough may fall, for example, in the range from about 0.05 to about 120 cubic feet of gas per minute for each square foot of active area of the gas diffusing surface of the gas transmitting body. (The term "active area" of the gas diffusing surface of a gas transmitting body is used in this specification and claims to means the area defined by lines tangent to the outermost openings in the gas diffusing surface at which gas bubbles are formed.) Such a gas diffusing body may be formed of a porous ceramic material a sintered metal material, or the like. Typical volumetric gas flow rates for gas diffusing apparatus including such a gas diffusing body are as follows:

| Type of Gas Diffusing Body | Cubic Feet of Gas per Minute for Each Square Foot of Active Area of Gas Diffusing Surface |
|---|---|
| (1) Fixed porous ceramic gas diffusing body | About 0.05 to about 1.0 |
| (2) Fixed sintered metal gas diffusing body | " |
| (3) Rotating gas diffusing body formed of material as in (1) or (2) above | About 0.1 to about 2 |
| (4) Cylindrical porous ceramic gas diffusing body with turbulent flow of shearing liquid (Pat. No. 3,545,731) | About 120 (Pat. No. 3,545,731, col. 6, lines 21-25, adjusted for calculated active area of gas diffusing surface) |

A typical gas flow rate when gas diffusing apparatus is used in the practice of this invention that includes a gas transmitting body having gas transmitting passages therethrough that provide a plurality of substantially straight, unimpeded paths for gas flow may fall, for example, in the range from about 1 to about 70 cubic feet of gas per minute for each square foot of active area of the gas diffusing surface of the gas transmitting body. Such a gas diffusing body may be a perforated plate, a plurality of hollow cylindrical fiber glass capillary tubes embedded in a plastic matrix, or the like. Typical volumetric gas flow rates for gas diffusing apparatus including such a gas diffusing body are as follows:

| Type of Gas Diffusing Body | Cubic Feet of Gas per Minute for Each Square Foot of Active Area of Gas Diffusing Surface |
|---|---|
| (5) Rotating perforated plate gas diffuser (Pat. No. 3,775,307) | About 3-18 |
| (6) Fixed hollow capillary tubes embedded in plastic (commonly assigned Pat. appln. S.N. 441,573, now Pat. No. 3,927,152) | About 15-70 |
| (7) Rotating perforated plate gas diffuser (modification of Pat. No. 3,650,513) | About 28 |

With a gas flow rate that is below the typical ranges stated above for various types of gas diffusers, the volume of gas diffused into the liquid medium in a given period of time is likely to be so small that even though the bubbles produced are of a desirable small size and good uniformity of size, the output of the apparatus is too low for practical use. If the gas flow rate is increased above the typical ranges stated above for the indicated types of gas diffusers, the pressure drop through the gas diffusing apparatus is likely to be so high that the cost of maintaining the increased flow rate becomes prohibitively high.

The stated ranges of gas flow rates are also important for the achievement of the present invention's objective of simultaneous flotation and biochemical treatment. If the gas flow rate is lower than the indicated range for a particular gas diffusing apparatus, the quantity of oxygen in the oxygen-containing gas bubbles that can be utilized for biochemical treatment of the aqueous waste material is likely to be too small to produce a desirable level of treatment, because it will not provide enough oxygen to support the biological oxidation function in the activated sludge process. If the gas flow rate is higher than the indicated range, the diameter of the resulting gas bubbles is likely to increase above the maximum size limitation that is an important part of this invention, which would interfere both with the production of a desirable "float" and with effective treatment of the material into which the bubbles are introduced. In addition, the higher rate of introduction of bubbles may itself create such a turbulent condition throughout the aqueous material being treated that it is not possible to have a quiescent zone at the surface for accumulation of any floated sludge that is formed.

In order to achieve the benefits of this invention, it is not necessary that the apparatus employed be capable of producing oxygen-containing bubbles within the maximum size limitation of the claims at any and all gas flow rates that fall within the specified ranges. The invention can in fact be utilized with gas diffusing apparatus that produces bubbles small enough to come within the maximum size indicated in the claims for any substantial part of the specified range of gas flow rates. Thus, a particular gas diffuser that produces small enough bubbles at the low end of the range of gas flow rates may be useful in the practice of this invention even though it produces bubbles that are too large to fall within the defined invention when it is operated at the high end of the gas flow range.

It should be noted that the fact that certain known types of gas diffusers may produce small enough oxygen-containing gas bubbles for use in this invention does not mean that any such gas diffusers have ever been used in this way before the present invention was made. The biological oxygen demand ($BOD_5$) of aqueous waste material treated by the activated sludge process may be practice vary widely, from as low as perhaps 40 to as high as about 20,000 mg./l. or even higher. The $BOD_5$ figure for sewage in a typical sewage treatment installation falls in the low end of this range. Even at this low end of the range for biological oxygen demand, in a typical sewage treatment plant if the gas diffusers used have an individual gas flow rate that is as low as some of those indicated in the first table above, a large number of diffusers would be required in order to provide an overall system gas flow rate tht is sufficiently high to introduce enough oxygen into the mixed liquor for the simultaneous flotation and biological oxidation that is an essential hallmark of this invention.

For the reasons given, all of the maximum bubbles sizes stated in this specification and claims are for gas bubbles introduced into "standard simulated sewage" at a volumetric gas flow rate falling within any part or all of a defined range when bubble size is specified for apparatus, and into "duplicate simulated sewage" at the same volumetric gas flow rate as is actually employed in the method under consideration when bubble size is specified for a method of treating an opaque aqueous waste material such as typical sewage.

Absorption of Other Gases into Bubbles to Replace Dissolved Oxygen

In the practice of this invention, the bubbles of oxygen-containing gas diffused into the active biological mass tend to grow smaller in size as oxygen is transferred from the bubbles into the liquid for utilization in the treatment of the mass. It is believed, for example, that about 90 percent of the gas in pure oxygen bubbles diffused into mixed liquor derived from sewage is consumed in the biochemical reactions that take place with this invention as the oxygen is metabolically utilized by the biological life available in the sewage.

At the same time, carbon dioxide and probably a minor amount of nitrogen are produced as end products of the treatment reactions, and the existing bubbles have an offsetting tendency to grow larger in size as they absorb at least some of that carbon dioxide and nitrogen. The bubbles also absorb some of the nitrogen that is present as one constituent of any air that is dissolved in the sewage. In addition, of course, any bubble containing a given quantity of gas will tend to expand when the hydrostatic pressure decreases as the bubble rises within a body of liquid.

It has been found in the practice of this invention that for every pound of oxygen introduced as fine bubbles of gas into mixed liquor derived from sewage, approximately 2 to 3 cubic feet of a combination of carbon dioxide, unutilized oxygen, nitrogen and other gases result as free rising bubbles that can produce a "float" of quite high solids concentration at the surface of the liquid. It has been estimated that a 500 micron diameter bubble introduced into the mixed liquor as a free gas bubble at approximately 15 feet below the surface of the liquid will result in a final free rising bubble having a diameter of about 300 microns, with the absorption of carbon dioxide, nitrogen and other gases by the bubble tending to offset its loss of oxygen by transfer into the body of liquid.

Many such bubbles, as well as bubbles of considerably smaller size, will become attached to small particles of sludge suspended in the mixed liquor in the treatment and flotation chamber, and are of such a size that the buoyant force of the gas bubbles can carry these particles to the surface, where they are consolidated with other particles to form a float of intermixed solid sludge and gas bubbles for withdrawal from the apparatus.

Minimum Bubble Size

As indicated above, improved results with this invention can be obtained if the oxygen-containing gas bubbles introduced into the treatment and flotation chamber have maximum diameters of about 200 microns, and still better results are achieved with even smaller sized bubbles. However, as is known to those skilled in the art, any gas bubbles that are of too small a size may be wholly dissolved in a body of liquid in which they are diffused, as the relatively high surface tension at the bubble interface in comparison to the volume of the bubble forces the gas in the bubble into solution. It is believed that the minimum bubble diameter at which complete dissolution of the bubble occurs is somewhere around 5 to 10 microns with typical sewage.

Any oxygen thus dissolved will still be available for biochemical treatment of the mixed liquor, but will no longer be available in bubble form to help produce the sludge flotation that is one of the principal objectives of this invention. Hence a substantial portion of the oxygen-containing gas bubbles introduced into the treatment and flotation chamber below the quiescent zone at the top of the chamber must be large enough to avoid total dissolution adjacent the point of their introduction into the mixed liquor in the chamber. In other words, a substantial portion of the oxygen-containing bubbles must be sufficiently large to survive as bubbles for a period of time during which they can move away from their point of introduction into the body of liquid, and either be supplemented by absorption of other gases in the manner explained above, or attach themselves to suspended solid particles to help form the floated sludge whose formation is one of the objectives of this invention.

Continuous Recirculation with Simultaneous Maintenance of Quiescent Zone

Another feature of critical importance in this invention is the maintenance of continuous recirculation of the contents of the recirculation zone beneath the quiescent zone that occupies at least the downstrream part of the treatment and flotation chamber, in order to help keep the mixed liquor in the chamber from going anaerobic. This must be accompanied by introduction of an adequate quantity of oxygen into those contents.

There must also be continuous recirculation of the entire contents of any upstream part of a combined treatment and flotation chamber that includes no quiescent zone, or the entire contents of a separate biological oxidation tank, as the case may be. This must be accompanied by the introduction of an even larger quantity of oxygen-containing bubbles in those parts of the system, because of the higher demand for oxygen to be utilized by the biological life in the suspended solids in those upstream portions of the system.

The continuous recirculation in the downstream and upstream parts of the system just mentioned may suitably be effected by pumping the recirculated aqueous material through gas diffusing means, in the form of a stream of liquid that shears nascent bubbles from a plurality of capillary openings and then flows out into the body of liquid with fine sheared bubbles entrained therein. The inlets for such pumps should be at least about three inches below the surface of the mixed liquor in the parts of this system where the quiescent zone is present for accumulation and concentration of floated sludge, and in any event the pump must be of such a type and the suction inlet located at such a depth that no substantial amount of air will be drawn into the inlet along with the liquid to be pumped. The inlets for such pumps that produce continuous recirculation of the entire contents of a separate biological oxidation tank, or of the entire contents of the upstream part of a combined treatment and flotation chamber, may be quite close to the surface so long as air is not drawn into the pump inlet along with liquid, and should in no case be more that about two feet below the level of the mixed liquor in the tank or chamber.

This positioning of the pump inlets will help produce the continuous recirculation that is necessary for adequate sewage treatment, and at the same time permits the maintenance of the quiescent zone at the top of the treatment and flotation chamber that is essential to the practice of this invention.

BRIEF DESCRIPTION OF DRAWINGS

FIG. 1 is a plan view of a preferred form of the apparatus of this invention, with a single treatment and flotation chamber, which apparatus is adapted for the withdrawing of "float" over the downstream end wall of the chamber (the contents of the chamber and the float withdrawal means being omitted for clarity);

FIG. 2 is a longitudinal cross sectional view of the same apparatus taken generally along the line 2—2 of FIG. 1, with the chamber contents and float withdrawal means shown;

FIG. 3 is a transverse cross sectional view of the upstream part of the same apparatus, taken generally along the line 3—3 of FIG. 1, with the tank contents shown;

FIGS. 4 and 5 are transverse cross sectional views of the downstream part of the same apparatus, taken generally along lines 4—4 and 5—5, respectively, of FIG. 1, again with the tank contents shown;

FIG. 10 is a plan view of the apparatus of this invention in which a separate treatment and flotation chamber and a biological oxidation tank have a common wall between them in the form of a baffle means and are followed by a settling tank (with the mixed liquor, float withdrawal means, and means for withdrawing settled sludge from the floor of the settling tank omitted for clarity);

FIG. 11 is a longitudinal cross sectional view of the same apparatus, taken generally along the line 11—11 in FIG. 10, with the mixed liquor and all elements of the apparatus shown;

FIG. 12 is a transverse cross sectional view of the same apparatus, taken generally along the line 12—12 of FIG. 10 and looking toward the baffle wall between the biological oxidation tank and the treatment and flotation chamber, with the chamber contents of the "float" withdrawal means shown; and FIG. 13 is a similar cross sectional view of the same apparatus, taken generally along the line 13—13 of FIG.

Figure 7:
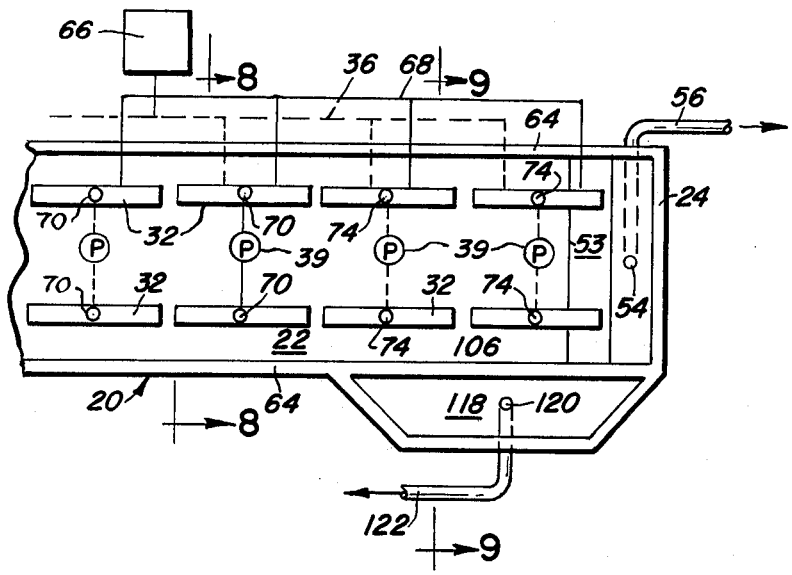
FIG. 7 is a fragmentary plan view of another embodiment of the apparatus of this invention, also with only a single treatment and flotation chamber, which is adapted for withdrawal of float over a downstream end portion of a side wall of the chamber (the contents of the chamber and the float withdrawal means being omitted for clarity)

10 and looking toward the downstream end wall of the treatment and flotation chamber.

DETAILED DESCRIPTION OF METHOD AND APPARATUS

The apparatus shown in FIGS. 1–5 and 7–13 is designed for use in a sewage treatment plant employing the activated sludge process. Three embodiments are illustrated.

SINGLE TREATMENT AND FLOTATION CHAMBER

In the apparatus shown in plan view in FIG. 1, treatment and flotation chamber 20 has an upstream part 21 and a downstream part 22. The apparatus is adapted for the withdrawing of "float" over downstream end wall 24 of chamber 20, but both the float and the withdrawal means are omitted from FIG. 1 for clarity.

Aqueous waste material to be treated in this apparatus is introduced into treatment and flotation chamber 20 through inlet 26, located in the central section of upstream end wall 27. The aqueous waste material may be introduced as raw sewage in an untreated state, or if desired, it may be pretreated by removal of grit, large solids, grease or similar materials. As explained below, activated sludge — either in the form of floated sludge skimmed off from chamber 20 itself or settled sludge from the settling tank that follows the treatment and flotation chamber — may also be introduced at inlet 26.

Materials moving from left to right in FIG. 1 pass at about region 28 from upstream part 21 of chamber 20 into downstream part 22. As is seen, "mixed liquor," containing soluble waste material and suspended solid particles that have been "activated" by the biological oxidation treatment in upstream part 21 as well as return activated sludge from farther downstream, moves through area 28 into downstream part 22 of chamber 20.

The preferred location for aqueous waste material inlet 26 is as shown in FIG. 1, at one end of treatment and flotation chamber 20, with the mixed liquor outlet at the other end of the chamber. However, if desired, there may be more than one inlet, which may be located in various parts of the chamber so long as the chamber has one or more outlets spaced a substantial distance from the inlets.

Biological Oxidation

Gas diffusing means 32 are positioned adjacent the bottom of the upstream part of chamber 20 for dispersing a quantity of oxygen-containing gas bubbles through the body of liquid contained therein. Oxygen-containing gas is delivered to gas diffusers 32 from compressor 34 through feed lines 36.

The gas bubbles thus introduced into the mixed liquor in chamber 20 may be pure oxygen. Or, if desired, they may be formed of any other oxygen-containing gas, such as for example oxygen with about 5 to about 20 percent by volume of other gases, or oxygen and nitrogen in the form of compressed air, or oxygen mixed with ozone or other oxidizing gases. If the oxygen in the bubbles is present in as low a proportion as is the case with air, a larger number of gas diffusing means 32 will be required.

As bubbles rise from gas diffusers 32 through the contents of chamber 20, they are absorbed in the aqueous material contained in the chamber, and adsorbed by solid particles suspended in the aqueous material. A large part of the oxygen in the bubbles is transferred to the liquid medium as dissolved oxygen, and is then utilized by the biological life in the suspended solids to form reaction products that are included in the "activated sludge" that settles to the bottom in a later stage of the process. Most of the remainder of the gas in the bubbles remains in the circulating mixed liquor, with preferably none of the oxygen escaping from the top surface of the contents of the chamber.

Gas Diffusing Means

In the embodiment of FIGS. 1–5, gas diffusers 32 operate on the bubble shearing principle, in which a stream of liquid shears nascent gas bubbles from capillary openings in the gas diffusing surface of a gas transmitting body. Commonly assigned application for patent Ser. No. 441,573, entitled "Method and Apparatus for Bubble Shearing and Method of Fabricating the Apparatus," now U.S. Pat. No. 3,927,152 discloses bubble shearing apparatus of this general type.

In gas diffusing means 32, as shown schematically in FIG. 2, a stream of liquid flows through each of a plurality of vertical elongated slots 38, where it shears gas bubbles from a plurality of capillary openings in one or both walls defining the slot. The streams of liquid then flow outward from their respective slots 38 into the body of liquid contained in treatment and flotation chamber 20, with the bubbles entrained therein.

Other forms of gas diffusing means are suitable so long as they (1) provide bubbles of oxygen-containing gas that meet the size requirements of this invention, and (2) produce the bubbles from gas in the free state instead of from gas dissolved in a pressurized liquid medium. Any gas diffusing apparatus that meets these two requirements may be used, whether the gas transmitting body employed in the apparatus has, for example, a labyrinthine network of gas transmitting passages therethrough, passages providing a plurality of substantially straight, unimpeded paths for gas flow, or some other form of construction.

Recirculation of Mixed Liquor

The liquid in upstream part 21 of chamber 20 is recirculated by pumps, shown schematically at 39, whose inlet openings 40 are located no more than about two feet below the level to which the chamber is filled with mixed liquor during normal operation (FIG. 2). If the inlet openings of the recirculating pumps are located any farther than this below the top surface of the liquid, the resulting recirculation in the chamber will generally be inadequate. The liquid is then delivered through conduits 42 to gas diffusing means 32, where it is utilized in the bubble shearing already described.

The biological oxidation process will proceed more effectively the better the circulation of the contents of upstream part 21 of chamber 20, and the better the resulting mixing of the oxygen throughout those contents. The upstream part of chamber 20, gas diffusers 32, and the reciruclating pumps just described are adapted to keep those contents, including oxygen absorbed by the aqueous material and oxygen adsorbed by the suspended solid particles, in substantially continuous circulation from top to bottom of the chamber.

As mentioned just above, the location of pump inlet openings 40 only two feet (or less) below the level to which the chamber is filled with mixed liquor helps to produce effective circulation of the liquid. In addition, with gas diffusing means 32 located between the longitudinal axis of chamber 20 and side walls 44 of the chamber, the aqueous waste material introduced through inlet 26 mixes with the contents of the chamber and tends, as seen in FIGS. 2 through 5, to flow down to the bottom of the chamber and there form rising currents along side walls 44, and up through the middle of the chamber, under the influence of the streams of shearing liquid flowing from the gas diffusers.

The circulation of the contents of the upstream part of chamber 20, facilitated by cover members 46 at the bottom of side walls 44 and cove members 48 at the top of walls 44, produces four rolling motions of the body of mixed liquor, moving in the clockwise direction in the far left-hand part and intermediate right-hand part of chamber 20 in FIG. 3, and in the counterclockwise direction in the intermediate left-hand part and far right-hand part of the chamber. In each case the rising current turns downward into the respective pump inlet openings 40. As shown, these four rolling motions increase the extent of dispersion of the oyxgen-containing gas bubbles throughout the contents of upstream part 21 of chamber 20. At the same time, recirculating pump means 39 continuously propel at least portions of the contents of this part of chamber 20 from the top portion of the chamber to gas diffusers 32, located in the bottom portion of the chamber.

Other patterns of circulation of the contents of the upstream part of the treatment and flotation chamber of this invention may be employed, if desired, so long as the mixed liquor contained in that part of the chamber is continuously recirculated to promote the biological oxidation of the material being treated.

Still other expedients may be employed to keep the contents of upstream part 21 of chamber 20 well mixed, in order to increase the effectiveness of the biological oxidation process. Thus, liquid sprays of the type that have conventionally been used to combat foaming in an aeration tank may be employed to cause any sludge that rises to the surface in upstream part 21 of the chamber to resubmerge in the aqueous medium in the chamber. Or, if desired, one may abandon the goal of recirculating any largely untreated sludge that floats to the top — if the amount of such float is not too great — and simple blow it to the downstream end of chamber 20 by the use of air or liquid jets properly positioned above the chamber, thus leaving the material that remains in the upstream part of the chamber in a well mixed condition.

Bubble Size

The desired mass transfer of gas to the liquid contents of upstream part 21 of chamber 20 should be effected if the gas diffusing means that produces the oxygen-containing bubbles is adapted to produce bubbles substantially all of which are no more than about 500 microns in diameter at the point at which they are introduced. Bubbles having a diameter no greater than about 500 microns, measured in "standard simulated sewage" or "duplicate simulated sewage," as the case may be, and at a particular range of gas flow rates, all as explained above, have a rise rate sufficiently slow to provide adequate interaction with the mixed liquor into which they are introduced to accomplish near complete dissolution of the oxygen contained in the gas bubbles by the time the bubbles have completed their rise through the mixed liquor, and as a result little, if any, escape of oxygen gas takes place at the surface of the mixed liquor.

Improved results are obtained if substantially all of the oxygen-containing gas bubbles are no more than about 200 microns in diameter at the point of their introduction. Still better results are obtained if this dimension is no greater than about 100 microns, and the preferred value is no greater than about 50 microns. These bubbles sizes are again measured as explained above.

Whatever the maximum bubble size is with any given apparatus according to this invention, the bubbles will ordinarily be present in a range of sizes. Thus the median diameter of the bubbles will in each case be substantially less than the indicated maximum bubble diameter. It is preferred that substantially all the bubbles introduced into the contents of the upstream part of the chamber fall in a range in which the diameter of the largest bubbles is no more than about 10 times, and preferably even less, the diameter of the smallest bubbles.

Bubble shearing devices such as diffusing means 32 have been found to produce fine gas bubbles of a good degree of uniformity of size which are well adapted for use in the method and apparatus of this invention.

Flotation

The chemical and biological function of oxidation is best accomplished in upstream part 21 of chamber 20 through the physical function of maintaining adequate circulation and mixing of the contents of the chamber. In the downstream part of the chamber, the same physical functions of circulation and mixing are continued in the middle and lower levels of the chamber, but not in the upper level. There a quiescent zone is established so that suspended solid particles can rise to the surface of the liquid in the form of a "float," to be skimmed off or otherwise withdrawn as activated sludge for return to inlet 26 or for wasting. As pointed out above, the production of such a float has hitherto been considered to be undesirable if it occurs before the material being treated has passed through the settling tank in the next stage of the activated sludge process.

Quiescent Zone

As best seen in FIGS. 2, 4 and 5, downstream part 22 of treatment and flotation chamber 20 has a quiescent zone 50 extending horizontally therethrough in the upper portion of the chamber. In order to give the floated solid particles sufficient space in which to accumulate and be concentrated into a "float" adapted for easy removal, quiescent zone 50 in its thinnest portion extends down at least about three inches below the level to which treatment and flotation chamber 20 is filled with mixed liquor during normal operation thereof.

The liquid contents of treatment and flotation chamber 20 have a mean flow in the downstream direction from the inlet to the outlet of the chamber. The chamber shown in FIGS. 1–5 has a transfer zone 52 in its lower downstream portion from which mixed liquor flows to the next stage of the activated sludge process. Transfer zone 52 is bounded by end wall 24, slanting bottom wall 53 and side walls 64 of chamber 20. Effluent in the form of mixed liquor flows through outlet 54 at the bottom of chamber 20, and from there through pipe 56 to a conventional settling tank (similar to the settling tank shown in FIGS. 10 and 11), which is the final stage in this activated sludge installation.

Recirculation Zone

Recirculation zone 60 lies below upper quiescent zone 50 in downstream part 22 of treatment and flotation chamber 20 (FIGS. 2, 4 and 5). The contents of this recirculation zone, which constitute only a portion of the contents of downstream part 22 of chamber 20, are continuously recirculated in much the same way as the entire contents of upstream part 21 of the chamber are continuously recirculated through rolling motions induced by the streams of shearing liquid from gas diffusers 32 located on either side of the bottom of the chamber, as well as by other means. Coves 62 located at the bottom of side walls 64 of chamber 20 facilitate the production of these rolling motions.

Surprisingly, it has been found that a very low level of agitation, or in other words a highly quiescent condition, can be maintained in upper quiescent zone 50 at the same time that effective recirculation is maintained in recirculation zone 60 directly beneath the quiescent zone. As a result, a stable float 65 of solid particles and attached bubbles can be built up in upper zone 50 (FIGS. 2, 4 and 5), while the contents of recirculation zone 60 are being continuously recirculated within that zone.

In the embodiment illustrated in FIGS. 1 through 5, the additional means employed for recirculation of the contents of zone 60 is the plurality of pumps 39 located at successive positions in the downstream direction in floatation chamber 22. Inlet openings 70 of the farthest upstream pumps 39 in the part of chamber 20 over which quiescent zone 50 lies must be at least about three inches below the level to which chamber 20 is filled with mixed liquor during normal operation thereof, in order that float 65 formed on the surface is permitted sufficient stability to grow in thickness as it is moved, in a manner to be explained below, towards the downstream end of chamber 20.

As illustrated in FIG. 2, pump inlet openings 70 in downstream part 22 of chamber 20 are preferably at a lower level than are pump inlet openings 40 in upstream part 21 of the chamber. The liquid being recirculated is pumped through conduits 72 to be employed in bubble shearing in gas diffusers 32. Pump inlet openings 74 located farther downstream are at a still lower level than pump inlets 70, and conduits 76 lead from those inlets to gas diffusers 32. As will be seen, the result of this progressively lower positioning of successive pump inlet openings produces a recirculation zone 60 of decreasing height as one proceeds downstream in chamber 20, and by the same token an upper quiescent zone 50 of increasing depth as one proceeds in the downstream direction.

Bubble Size

Gas diffusers 32 in the downstream part of treatment and flotation chamber 20 operate on the bubble shearing principle, and may be generally similar to the gas diffusers in upstream part 21 of the chamber. Diffusers 32 in downstream part 22 produce gas bubbles a substantial portion of which are large enough to avoid total dissolution adjacent their point of introduction into any body of liquid contained in chamber 20, and substantially none of which are more than about 500 microns in diameter at that point.

Improved results are achieved when substantially all of the gas bubbles are no more than about 200 microns in diameter, and further improvement if substantially all the gas bubbles are no larger than about 100 microns, at their point of introduction. In the preferred embodiment of this apparatus, substantially all the bubbles are no more than about 50 microns in diameter at that point.

All determinations of gas bubble size are made as explained above.

The method and apparatus of this invention operate most effectively the greater the degree of uniformity of bubble size in the gas bubbles that are introduced into the contents of at least the downstream portion of treatment and flotation chamber 20. It has been found that best results are achieved when substantially all these bubbles fall in a range in which the diameter of the largest bubbles is no more than about 10 times the diameter of the smallest, and preferably even less. Uniformity of bubble size helps to produce a uniform rise rate of free bubbles through the contents of the chamber. Thus, disproportionately large bubbles that tend to form by the coalescence of one bubble with another that has overtaken it, and then tend to produce local turbulence or "plumes" that may interfere with the maintenance of upper quiescent zone 50, are in the main avoided.

Nature of Gas Bubbles

The gas bubbles introduced into treatment and flotation chamber 20 may be oxygen, air, or any other oxygen-containing gas compatible with the aqueous waste material. If the gas is the same oxygen-containing gas that is employed in the upstream part of chamber 20, it may be introduced from compression pump 34 through pipes 36. If it is another gas, it may be introduced from source 66 through pipes 68.

Dual Function of Bubbles

Gas diffusers 32 in downstream part 22 of chamber 20 produce gas bubbles from which oxygen may be transferred into the liquid phase as the bubbles rise through the body of liquid in the chamber. The oxygen thus dissolved in the aqueous material is available to produce biological oxidation of both aqueous waste and suspended solid waste in that material.

As explained above, the oxygen in the bubbles is supplemented by quantities of carbon dioxide and nitrogen, as well as other gases formed in the biological oxidation process. The resulting bubbles attach themselves to some of the solid particles suspended in the liquid to form a "float" of intermixed solid sludge and gas bubbles. Since float 65 has a lower density than the aqueous medium in which the solid particles are suspended, it rises to the top of chamber 20.

Initial Velocity of Liquid Movement Accompanying Introduction of Bubbles

The introduction of the gas bubbles into the body of liquid is such that the initial velocity with which the bubbles and the liquid in which they are entrained move in the aqueous material permits quiescent zone 50 to be maintained in the upper portion of chamber 20.

As the gas bubbles flow outward from gas diffusers 32 entrained in streams of liquid, each of the streams moves with a typical initial velocity of approximately 20 feet per second along initial flow lines that are oriented at angles that are no more than about 30° above or below the horizontal. In other words, the liquid streams and entrained bubbles move through the body of liquid contained in chamber 20 in directions that do not initially flare out more that about 30° above or below the horizontal.

When the bubbles reach a distance of about 4 to about 8 feet from the gas diffuser from which they flow, they ordinarily have slowed down sufficiently that they begin to move in a more upward direction. As they rise, they contribute to the recirculation of the contents of the chamber below quiescent zone 50, but do not interfere with the maintenance of the quiescent zone. Adequate recirculation of the contents of zone 60 is required in order to avoid having the contents go anaerobic, which would inhibit the treatment of the waste, and would thus interfere with the proper functioning of the activated sludge when it is returned to inlet 26 at the upstream end of chamber 20.

Bubbles Formed from Gas in Free State

In this invention the gas bubbles introduced into the contents of at least the downstream part of chamber 20 over which quiescent zone 50 lies are produced directly from gas in the free state and are introduced at a pressure substantially the same as the hydrostatic pressure of the liquid in the chamber at the point of introduction of the bubbles. To this end, in the apparatus of this invention the means for delivering oxygen-containing gas at least to gas diffusing means 32 in downstream part 22 of chamber 20 is adapted to deliver the gas at such a pressure that the gas is discharged from means 32 at a gauge pressure, measured immediately adjacent the outlet orifices of the diffusing means, that is not substantially greater than about 1/34 of one atmosphere for every foot that the diffusing means is located below the level to which the chamber is filled with mixed liquor in normal operation of the apparatus.

When the bubbles formed directly from gas in the free state rather than from gas dissolved in pressurized liquid as in the known dissolved air technique (which typically might require a pressure of 60 p.s.i.g. or even more), considerably lower equipment cost is involved. As has been explained above, this feature of the present invention avoids the necessity of all the extra pumping capacity and tank capacity that are required when the dissolved air technique is used in a known special flotation tank following the settling tank in an activated sludge sewage treatment plant, and the still more extensive pumping equipment and tank capacity that would be required if an attempt were made to employ that known technique for simultaneous biological oxidation and flotation.

It is believed that the small size and the formation of the oxygen-containing gas bubbles directly from gas in the free state are largely responsible for the fact that use of this invention makes it possible to eliminate the addition of polymers to achieve an adequate floated sludge. As mentioned above, omission of polymer additions results in a substantial cost saving for this method of sewage treatment.

Figure 6A:
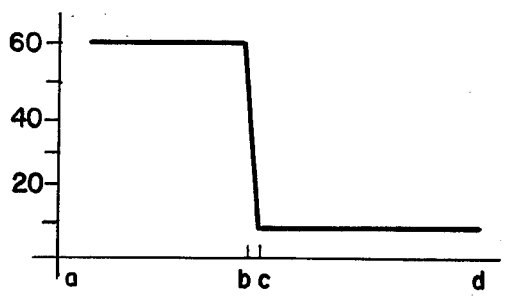
FIG. 6A is a graph of the pressure to which the gas is subjected in the dissolved air flotation technique, as the air is introduced into a liquid medium under pressure, passes through a typical venturi nozzle, and comes out of solution in a special flotation chamber in the form of fine bubbles.

FIG. 6A shows graphically the pressure to which the dissolved gas is subjected in the prior method, and the results of the release of that pressure when the pressurized liquid medium containing the dissolved air is introduced into the body of mixed liquor in the special flotation chamber. As is seen, the pressure to which the air dissolved in the pressurized liquid is subjected rises to about 40 to 60 p.s.i.g. (a-b on the graph), then drops through a pressure gradient that extends, for example, along the 3 inch or so length of a conventional venturi nozzle (b-c), until it drops to equal the hydrostatic pressure of about 7 to 8 p.s.i.g. (at a depth of around 15 feet) of the body of liquid in the special flotation tank into which the air bubbles are introduced (c-d).

Figure 6B:
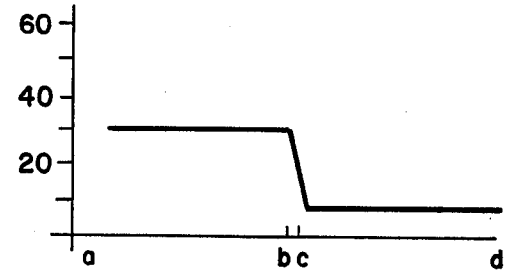
FIG. 6B is a graph of the pressure to which the gas is subjected in a bubble shearing device employed in the practice of this invention, as the gas passes from the gas plenum through a plurality of capillary tubes, and out the ends of those tubes to be sheared off as fine bubbles by a stream of shearing liquid.

In contrast to this, FIG. 6B shows graphically the pressure to which the oxygen-containing gas is subjected, in the embodiment of this invention disclosed in FIGS. 1 through 5, when bubbles are produced directly from gas in the free state. As is seen, the pressure to which the free gas is subjected in a gas diffusing means such as disclosed in the above mentioned patent application Ser. No. 441,573 rises to only about 30 p.s.i.g. at full rated gas volume as it is delivered to gas diffusers 32 from the gas plenum (a-b on the graph), then drops through a relatively uniform pressure gradient, as it passes through the capillary tubes of the diffusers (b-c), to the hydrostatic pressure of about 7 to 8 p.s.i.g. at a depth of about 15 feet in treatment and flotation chamber 20 (c-d).

FLOC SHEARING

Bubble shearing gas diffusers have still another advangtage in addition to those relating to bubble size and uniformity that are pointed out above.

Typically the suspended solids in sewage can be fairly readily broken up into smaller pieces — which will facilitate the desired formation of a "float" — under the application of external physical force such as that provided by the jet streams of liquid with air bubbles entrained therein that are emitted by a bubble shearing device such as gas diffusing means 32. Thus, the jet streams of bubbles from such a device are believed to produce smaller, lighter floc particles that are more easily moved upward through the liquid by the rising gas bubbles and form a denser float 65 on the surface, while not ordinarily producing such small particles that the surface area of the suspended solids is too small for the ready capture of one or more gas bubbles by the floc.

Float Withdrawal Means

Float withdrawal means 78, moving in a counterclockwise direction in FIG. 2, helps to build up the thickness of float 65 as the float is moved downstream through treatment and flotation chamber 20. Blades 80, carried by endless chain 82 traveling around rollers 84, push float 65 to the right in FIG. 2, along the surface of the liquid in chamber 20. As is seen, as more and more suspended solid particles accumulate in upper quiescent zone 50 in downstream part 22 of the chamber, the float grows thicker and thicker.

At beach 86 (FIG. 2), blade 80 pushes float 65 out of chamber 22, and the floated sludge drops into reservoir 88. The sludge moves through outlet 90 and pipe 92 to pump 94, which may pump at least a portion of the sludge back through pipe 96, valve 100, and pipe 102 to inlet 26 of chamber 20.

At the same time, if desired, a portion of the floated sludge can be pumped by pump 94 through pipe 96 and valve 98 to a waste accumulating zone (not shown) for further concentration, as for example by use of a vacuum filter, in that zone. As already pointed out above, this floated sludge, which may typically be about 6—8 percent solids concentration by weight, has excellent dewaterability characteristics. As a result, filter cakes having a solids concentration of 17—20 percent can be achieved with only minimal use of the usual dewatering agents (such as ferric chloride and lime), with resulting important cost savings.

Mixed liquor flows from outlet 54 of chamber 20 to a settling tank (such as shown in another embodiment in FIGS. 9 and 10), which is the next stage of the activated sludge process. The liquid must not be wholly clarified at this point, since suspended solid particles must settle to the floor of the settling tank, to be withdrawn and returned as "activated sludge" through pipes 104 and 102, for reintroduction through inlet 26 into chamber 20.

If necessary, some of the activated sludge from the settling tank can be diverted to a waste accumulating zone as part of the total waste sludge from the sewage treatment plant. However, it is best if as much activated sludge as possible is returned from the settling tank to treatment and flotation chamber 20 and as little as possible is disposed of as waste. To this end, it is preferred that more than one half of the total waste solids from the sewage treatment plant as a whole be removed directly from chamber 20 as floated sludge, and less than one-half of the total waste solids be withdrawn from the settling tank. In fact, the ultimate goal of the present invention is that the total waste solids derived from the entire plant (except for heavy inert solids) be taken off in the form of float and none of it be derived from the settling tank, in which case all the activated sludge from the latter tank is returned for introduction into the body of mixed liquor into which oxygen-containing bubbles are being diffused.

SECOND EMBODIMENT OF SINGLE TREATMENT AND FLOTATION CHAMBER

Figure 8:
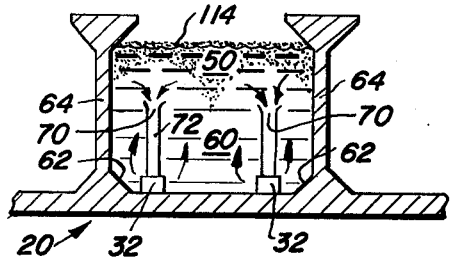
FIG. 8 is a transverse cross sectional view of the apparatus of FIG. 7, taken generally along the line 8—8 in that figure, with the chamber contents shown.
Figure 9:
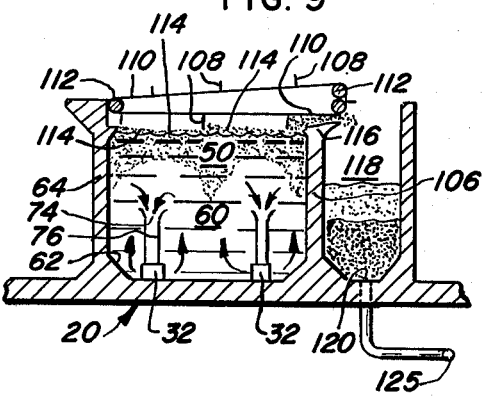
FIG. 9 is a transverse cross sectional view of the apparatus of FIG. 7, taken generally along the line 9—9 of that figure, with the chamber contents and the float withdrawal means shown.

FIG. 7 is a fragementary plan view of another embodiment of the apparatus of this invention for treatment of aqueous waste material by the activated sludge process, in which there is again a single treatment and flotation chamber. In this embodiment, the float built up in downstream part 21 of chamber 20 is withdrawn over downstream end portion 106 of side wall 64 of the chamber. In FIGS. 7 through 9, like parts are given the same designator numerals as the embodiment of FIGS. 1 through 5. Except for the means for withdrawal of the floated sludge, the two embodiments are the same.

Floated sludge 114 on top of the body of liquid in chamber 20 is withdrawn over side wall 106 by skimming blades 108, carried by endless conveyer 110 traveling around rollers 112 (FIG. 9). The withdrawal means comprised of elements 108, 110 and 112 is omitted from FIG. 7 for the sake of clarity.

As skimming blades 108 move across the top of the contents of chamber 20 from left to right in FIG. 9, float 114 increases in thickness. When float 114 is pushed up onto and over beach 116, it drops into reservoir 118. From there, it flows through outlet 120 and pipe 123 back toward the inlet end of chamber 20. At least a portion is returned to inlet 26 of the chamber, and the remainder, if any, is piped to a waste accumulating zone for further concentration in that zone.

BIOLOGICAL OXIDATION TANK AND TREATMENT AND FLOTATION CHAMBER WITH COMMON WALL

FIGS. 10 through 13 show an embodiment of the biological oxidation and flotation apparatus of this invention in which biological oxidation tank 140 and treatment and flotation chamber 142 have a common wall between them in the form of baffle means 144. The apparatus shown is adapted for the withdrawing of float through a downstream end portion 146 of side wall 148 of chamber 142 (FIGS. 10, 12 and 13).

The aqueous waste material to be treated in this embodiment of the apparatus of this invention is introduced into biological oxidation tank 140 through inlet 150, located in the central section of upstream end wall 152. Vertical baffle means 154 deflects the incoming aqueous waste material downward into the mixed liquor that is contained in tank 140, and towards the bottom of the tank. As explained below, return activated sludge is also introduced into tank 140 through inlet 150.

As best seen in FIG. 12, baffle means 144 and bottom wall 156, which are common to both biological oxidation tank 140 and treatment and flotation chamber 142, define outlets 158,158 from tank 140 to chamber 142. Tank 140 is thus in direct communication with chamber 142, and mixed liquor moves, through outlets 158,158, directly into flotation chamber 142.

The preferred location for aqueous waste material inlet 150 is, as shown in FIG. 10, at one end of biological oxidation tank 140, with the mixed liquor outlet at the other end of the tank. However, if desired, the inlet may be located in some other part of the tank, as long as the tank has one or more outlets spaced a substantial distance from the inlet.

BIOLOGICAL OXIDATION TANK

Gas diffusing means 160 are positioned adjacent bottom wall 156 of biological oxidation tank 140, for dispersing a quantity of oxygen-containing gas bubbles through the body of liquid contained in the tank. Oxygen-containing gas is delivered to gas diffusers 160 from compressor 162 through feed lines 164. As with the embodiments of the apparatus of this invention previously discussed, the gas bubbles introduced into the mixed liquor in biological oxidation tank 140 may be pure oxygen, any oxygen-containing gas, or oxygen mixed with other oxidizing gases. With a gas having a proportion of oxygen as low as is contained in air, for example, a larger number of gas diffusing means will be required.

As bubbles rise from gas diffusers 160 through the material in tank 140, oxygen is absorbed by the mixed liquor and utilized by liquid waste and by biological solid particles suspended therein. As before, the oxygen-containing bubbles form reaction products with the suspended solids which are included in the activated sludge that ultimately settles to the bottom in settling tank 166, seen on the right-hand side of FIGS. 10 and 11.

Gas diffusers 160 operate on the bubble shearing principle. As shown schematically in FIG. 11, streams of liquid flow through at least one vertical elongated slot 168 in each gas diffusing means, where each stream shears gas bubbles from a plurality of capillary openings in one or both walls defining the slot. As a stream of liquid flows outward from each slot 168, it carries bubbles entrained in the stream into the body of liquid in tank 140.

A rolling motion is produced in the mixed liquor contained in biological oxidation tank 140 similar to the motion described above in the corresponding upstream part of the treatment and flotation chamber in the embodiment of this apparatus illustrated in FIGS. 1 through 5. The recirculation caused by this rolling motion is improved if the biological oxidation tank is at least about twice as long as it is wide. In the embodiment of FIGS. 10 through 13, the length of the tank is about four times its width. With proper design, an adequate rolling motion may also be obtained with a square or circular tank.

The liquid in tank 140 is also recirculated by pumps, shown schematically at 170, whose inlet openings 172 are located no more than about two feet below the level to which the tank is filled with mixed liquor in the tank during normal operation thereof (FIG. 11). The liquid is delivered through conduits 174 to gas diffusing means 160, where it is employed in the bubble shearing process.

Treatment and Flotation Chamber

As seen in FIGS. 11 through 13, treatment and flotation chamber 142 has a quiescent zone 176 in the upper portion of the chamber. This quiescent zone extends down at least about three inches below the level to which chamber 142 is filled with mixed liquor during normal operation of the chamber.

As seen in the same figures, chamber 142 includes transfer zone 178 in its lower portion from which mixed liquor can flow to settling tank 166. The mixed liquor flows through outlet 180 at the bottom of end wall 182, through channels 184 and 186, and into settling tank 166 (FIGS. 10 and 11).

Recirculation zone 190 lies between upper quiescent zone 176 and transfer zone 178. The partial contents of treatment and flotation chamber 142 contained in this recirculation zone are continuously recirculated through the action of streams of liquid and entrained gas bubbles rising from end portions 192 of the farthest downstream gas diffusing means 160, the major part of which is located in biological oxidation tank 140.

It has been found that a very low level of agitation, or in other words a highly quiescent condition, can be maintained in upper quiescent zone 176 at the same time that effective recirculation is maintained in recirculation zone 190. As a result, a stable float of solid particles and attached bubbles can be built up in upper zone 176 (FIGS. 11-13) while the contents of recirculation zone 190 are being continuously recirculated within that zone.

End portions 192 of gas diffusers 160 in treatment and flotation chamber 142 produce gas bubbles that rise through the body of liquid in the chamber, with at least some of the bubbles remaining unabsorbed in the aqueous material and attaching themselves to solid particles suspended in the liquid to form a float of intermixed solid sludge and gas bubbles that rises to the top of chamber 142. As explained above, carbon dioxide and nitrogen, along with other gases resulting from the biological oxidation process, also help to form this float.

Oxygen provided by the bubbles introduced into treatment and flotation chamber 142 is absorbed by the mixed liquor to produce biological oxidation of waste matter in the aqueous material at a desirable rate. The rate of introduction of the bubbles is low enough, however, that the initial velocity of the liquid movement accompanying the introduction of the bubbles will permit quiescent zone 176 to be maintained in the upper portion of chamber 142.

As the gas bubbles flow outward from gas diffuser end portions 192 entrained in streams of liquid, each of the streams moves with a typical initial velocity of approximately 20 feet per second along initial flow lines that are oriented at angles that flow out at no more than about 30° above or below the horizontal. When the bubbles reach a distance of about 4 to 8 feet from the gas diffusers from which they flow, they ordinarily have slowed down sufficiently that they begin to move in a more upward direction. As they rise, they contribute to the recirculation of the contents of the chamber below quiescent zone 176, but do not interfere with the maintenance of the quiescent zone.

A substantial portion of the gas bubbles introduced into treatment and flotation chamber 142 are large enough to avoid total dissolution at the point at which they are introduced into the body of liquid contained in the chamber. Substantially none of the bubbles are more than about 500 microns in diameter at the point of their introduction into the contents of the chamber. Improved results are achieved when substantially all of the gas bubbles are no more than about 200 microns in diameter at that point, and further improvement if substantially all the gas bubbles are no larger than about 100 microns at their point of introduction. In the preferred embodiment of this apparatus, substantially all the bubbles are no more than about 50 microns in diameter at that point. These bubble sizes are measured as explained above.

The method and apparatus of this invention operate most effectively the greater the degree of uniformity of bubble size in the gas bubbles that are introduced into the contents of treatment and flotation chamber 142. It has been found that best results are achieved when substantially all these bubbles fall in a range in which the diameter of the largest bubbles is no more than about 10 times in diameter of the smallest, and preferably even less.

Adequate recirculation of the contents of zone 190 is required in order to avoid having the contents go anaerobic, which would inhibit the treatment of the waste, and would thus interfere with the proper functioning of the activated sludge when it is later returned to inlet 150 at the upstream end of biological oxidation tank 140.

In the method of this invention, the gas bubbles introduced into the contents of treatment and flotation chamber 142 are produced directly from gas in the free state and are introduced at a pressure substantially the same as the hydrostatic pressure of the liquid in the chamber at the point of introduction of the bubbles. In the apparatus of this invention, the means for delivering the oxygen-containing gas to the gas diffusing means in treatment and flotation chamber 142 is adapted to deliver the gas at such a pressure that the gas is discharged from the diffusing means at a gauge pressure, measured immediately adjacent the outlet orifices of the diffusing means, that is not substantially greater than about 1/34 of one atmosphere for every foot that the diffusing means is located below the level to which the chamber is filled with mixed liquor during normal operation.

Float Withdrawal Means

Float withdrawal means 194 is comprised of endless chain 196, which carries blades 198 and moves around rollers 200. The bottom flight of withdrawal means 194 moves in the downward direction in FIG. 10, and out of the paper in FIG. 11; the endless chain travels in a clockwise direction in FIG. 12, and in a counterclockwise direction in FIG. 13.

As blades 198 of the bottom flight of the float withdrawal means move from right to left in FIG. 12, they push the float which is at the top of quiescent zone 176 to the left until it passes over beach 202 into float hopper 204. Hopper 204 is formed of vertical wall 206, slanting wall 208, bottom wall 210, and portion 146 of the side wall of chamber 142.

Float that is skimmed off the top of the contents of treatment and flotation chamber 142 leaves float hopper 204 through outlet 212 (FIGS. 12 and 13), and passes through pipe 214 to pump 216. From pump 216 the float moves through pipe 218 to pipe 220, valve 222, inlet pipe 224 and inlet 150, and thus into biological oxidation tank 140. If desired, a portion of the float may pass through valve 226 to be wasted elsewhere.

In the embodiment shown in FIGS. 10 through 13, float withdrawal means 194 is adapted to withdraw floated sludge from substantially the whole surface area of the contents of treatment and flotation chamber 142. If desired, means 194 may be adapted to withdraw floated sludge from only a part of the surface of the contents of chamber 142.

Settling Tank

The mixed liquor that flows as described above from the bottom of treatment and flotation chamber 142 through passages 184 and 186 is directed by vertical baffle means 228 (FIGS. 10 and 11) towards the bottom portion of settling tank 166, where solid particles settle out onto the floor of the tank.

The settled solid particles are withdrawn through outlet 230 and pass through pipe 232 to pump 234. From pump 234 they are moved through pipe 236, pipe 237, and inlet pipe 224 to inlet opening 150 of biological oxidation tank 140, where they enter the tank as activated sludge. If desired, some of this activated sludge in pipe 236 may be diverted to waste through valve 244 and pipe 246.

In the meantime, other solid particles settle out into the downstream portion of bottom wall 238 of tank 166. This settled sludge is moved along the tank floor to hopper 239 and outlet 230 by withdrawal means 240, which moves in a clockwise direction in FIG. 10. This portion of the settled sludge is thus moved through pipe 232 and pump 234 along with the solid particles that settled directly to the bottom of the tank upon being introduced into the settling tank.

Clarified liquid effluent flows across the top of adjustable weir 242, and from there out of the sewage treatment plant.

EXAMPLES

The following specific examples illustrate the practice of this invention:

Example 1

Typical sewage from a metropolitan area including residential and commerical sections is treated in an activated sludge sewage treatment plant of the type disclosed in FIGS. 1–5 and described above, and having a capacity of approximately 1 million gallons per day.

The total suspended solids concentration of the incoming sewage after removal of grit, large solids, grease and similar materials is approximately 0.01 percent by weight. The biological oxygen demand ($BOD_5$) of the sewage is approximately 125 mg./l. The incoming sewage is introduced at a rate of about 700 gallons per minute, and the detention time in the treatment and flotation chamber is about two hours.

Substantially pure oxygen bubbles most of which have diameters of about 20 to 100 microns at their point of introduction are diffused into the contents of the treatment and flotation chamber at an overall system gas flow rate of approximately 9.5 standard cubic feet per minute. The gas bubbles are introduced about 15 feet below the surface of the liquid contents of the treatment and flotation chamber, at a gauge pressure (measured as nearly as possible at the outlet orifices of the gas diffusing means) of approximately 0.45 atmosphere. The mixed liquor in the chamber is continuously recirculated as the oxygen bubbles are introduced, except for a quiescent zone at the surface of the liquid in the downstream portion of the system, all in the manner described above in this specification.

Solid sludge particles intermixed with bubbles of mixed oxygen, carbon dioxide, nitrogen and other inert gases rise in the liquid, to accumulate in the quiescent zone at the surface of the liquid. This floated sludge is withdrawn periodically and is found to have a solids concentration of approximately 7 percent by weight. The solids concentration of the mixed liquor that flows from the treatment and flotation chamber is approximately 0.4 percent by weight.

A portion of the mixed liquor effluent from the treatment and flotation chamber is held for a period of time in a conventional settling tank. Activated sludge that settles to the bottom of the tank is removed periodically. It is found to have a solids concentration of approximately 2 percent by weight. The effluent from the settling tank has a biological oxygen demand ($BOD_5$) of less than 15 mg./l.

Example 2

Sewage is treated by the method of this invention as described in Example 1, including a detention time of about two hours. The sewage under treatment in this example is similar to that treated in Example 1 with the addition of some industrial waste. This sewage has the following characteristics:

| | |
|---|---|
| Total suspended solids concentration by weight after preliminary screening | 0.01% |
| $BOD_5$ | 170 mg./l. |
| Rate of introduction | 700 g.p.m. |

Oxygen bubbles are introduced into the mixed liquor in the treatment and flotation chamber in the manner described in Example 1, with the following changes:

| | |
|---|---|
| Size of substantially all bubbles at point of introduction | 50 to 200 microns |
| Overall system gas flow rate | 13 s.c.f.m. |

The following are the results of the described practice of this invention:

| | |
|---|---|
| Solids concentration of floated sludge by weight | 7% |
| Solids concentration of mixed liquor by weight | 0.5% |
| Solids concentration of settled sludge | 2% |
| $BOD_5$ of plant effluent | less than 20 mg./l. |

Example 3

Waste water is treated by the method of this invention as described in Example 1, except that the detention time in the treatment and flotation chamber is about five hours. The waste water under treatment in this example is a medium concentration industrial waste, for example effluent from a sugar beet processing plant having the following characteristics:

| | |
|---|---|
| Total suspended solids con- | 0.025% |

| | |
|---|---|
| centration by weight | |
| BOD$_5$ | 600 mg./l. |
| Rate of introduction | 700 g.p.m. |

Oxygen bubbles are introduced into the mixed liquor in the treatment and flotation chamber in the manner described in Example 1, with the following changes:

| | |
|---|---|
| Size of substantially all bubbles at point of introduction | 50 to 250 microns |
| Overall system gas flow rate | 45 s.c.f.m. |

The following are the results of the described practice of this invention:

| | |
|---|---|
| Solids concentration of floated sludge by weight | 6% |
| Solids concentration of mixed liquor by weight | 0.5% |
| Solids concentration of settled sludge | 1.8% |
| BOD$_5$ of plant effluent | 60 mg./l. |

Example 4

Waste water is treated by the method of this invention as described in Example 1, except that the detention time is about seven and one-half hours. The waste water under treatment in this example is a highly concentrated industrial waste, for example a pulp and paper mill effluent having the following characteristics:

| | |
|---|---|
| Total suspended solids concentration by weight | 0.005% |
| BOD$_5$ | 1650 mg./l |
| Rate of introduction | 700 g.p.m. |

Oxygen bubbles are introduced into the mixed liquor in the treatment and flotation chamber in the manner described in Example 1, with the following changes:

| | |
|---|---|
| Size of substantially all bubbles at point of introduction | 50 to 500 microns |
| Overall system gas flow rate | 124 s.c.f.m. |

The following are the results of the described practice of this invention:

| | |
|---|---|
| Solids concentration of floated sludge by weight | 10% |
| Solids concentration of mixed liquor by weight | 0.6% |
| Solids concentration of settled sludge | 2% |
| BOD$_5$ of plant effluent | 150 mg./l. |

The above detailed description is given for ease of understanding only. No unnecessary limitations are to be understood therefrom, as modifications will be obvious to those skilled in the art.

We claim:

1. In the treatment of aqueous waste material by the activated sludge process, said aqueous material containing solid particles suspended therein, the steps of biological oxidation of said waste material and removal therefrom of suspended solids by flotation which comprise:

introducing said aqueous waste material and return activated sludge into a treatment and flotation chamber, said chamber having (a) a quiescent zone in the upper portion thereof extending horizontally through at least the downstream part of said chamber, and extending vertically downward at least about three inches below the level to which the chamber is filled with mixed liquor comprised of said aqueous waste material and return activated sludge, for accumulation and concentration of floated solids, and (b) a recirculation zone below said upper quiescent zone for continuous recirculation of the contents of said recirculation zone;

introducing a quantity of oxygen-containing gas bubbles into the lower portions of said mixed liquor in the treatment and flotation chamber, the bubbles introduced into the portion of said chamber over which said upper quiescent zone lies being produced directly from gas in the free state and being introduced through the gas diffusing surface of a gas diffusing means at a pressure substantially the same as the hydrostatic pressure of the liquid at the point of introduction of said bubbles into said liquid, a substantial portion of said latter bubbles being large enough to avoid total dissolution in said liquid in any region adjacent said point of introduction into said body of liquid, substantially all of said latter bubbles being no more than about 500 microns in diameter at said point of introduction, and said latter bubbles being introduced at a volumetric gas flow rate in the range from about 0.05 to about 120 cubic feet per minute for each square foot of active area of said gas diffusing surface in such quantity that (a) the initial velocity of liquid movement accompanying the introduction of said bubbles into the mixed liquor is low enough to permit said quiescent zone to be maintained in the upper portion of said chamber, (b) the oxygen provided by said bubbles that is absorbed by the mixed liquor produces biological oxidation of waste matter in said material, and (c) some of said bubbles, comprised in part of carbon dioxide resulting from said biological oxidation, attach themselves to some of said solid particles to form a float of intermixed solid sludge and gas bubbles, said float having a lower density than the aqueous medium in which said solid particles are suspended;

continuously recirculating throughout any upstream part of said chamber that is free of said quiescent zone the mixed liquor that is located in said upstream part of said chamber;

continuously recirculating throughout said recirculation zone in at least the downstream part of said chamber the mixed liquor that is located in said recirculation zone;

withdrawing at least a portion of said floated sludge from the top of said treatment and flotation chamber; and withdrawing mixed liquor from the bottom portion of said treatment and flotation chamber to deliver it to the next stage in said activated sludge process.

2. The biological oxidation and flotation steps of claim 1 in which substantially all the bubbles introduced into the mixed liquor in at least the portion of said treatment and flotation chamber over which said upper quiescent zone lies are no more than about 200 microns in diameter at the point of their introduction into said mixed liquor.

3. The biological oxidation and flotation steps of claim 1 in which substantially all the bubbles introduced into the mixed liquor in at least the portion of said treatment and flotation chamber over which said upper quiescent zone lies are no more than about 100 microns in diameter at the point of their introduction into said mixed liquor.

4. The biological oxidation and flotation steps of claim 1 in which substantially all the bubbles introduced into the mixed liquor in at least the portion of said treatment and flotation chamber over which said upper quiescent zone lies are no more than about 50 microns in diameter at the point of their introduction into said mixed liquor.

5. The biological oxidation and flotation steps of claim 1 in which the bubbles introduced into the aqueous waste material located in at least the portion of said treatment and flotation chamber over which said upper quiescent zone lies are produced by employing at least one stream of liquid to achieve bubble shearing at a gas diffusing surface, substantially all of said bubbles thus produced being no more than about 500 microns in diameter at the point of their introduction into said body of liquid, said bubbles being introduced into said aqueous waste material in said treatment and flotation chamber at a volumetric gas flow rate in the range from about 15 to about 70 cubic feet per minute for each square foot of active area of said gas diffusing surface.

6. The biological oxidation and flotation steps of claim 5 in which each of said liquid streams shears gas bubbles from a plurality of capillary openings, and then flows into said body of liquid in said treatment and flotation chamber with said bubbles entrained therein.

7. The biological oxidation and flotation steps of claim 6 in which each of said liquid streams flows into said body of liquid along initial flow lines oriented at angles that are no more than about 30° above or below the horizontal.

8. The biological oxidation and flotation steps of claim 6 in which said streams of liquid are formed by pumping mixed liquor from a level at least about three inches below the level to which said treatment and flotation chamber is filled with mixed liquor, so that the liquid delivered to said gas diffusing means is simultaneously utilized as the shearing liquid for said bubble shearing and recirculated within said recirculation zone, while said quiescent zone for the accumulation and concentration of floated sludge is maintained in the top portion of said chamber above said recirculation zone.

9. The biological oxidation and flotation steps of claim 1 in which said upper quiescent zone in said treatment and flotation chamber has a greater depth at its downstream end than at its upstream end, so that the float formed in said zone is thicker at its downstream end than at its upstream end.

10. The biological oxidation and flotation steps of claim 1 in which a portion of said floated sludge withdrawn from the top of said treatment and flotation chamber is returned to the inlet of said chamber.

11. The biological oxidation and flotation steps of claim 1 in which at least a portion of said floated sludge withdrawn from the top of said treatment and flotation chamber is diverted to a waste acccumulating zone for further concentration in said latter zone.

12. The biological oxidation and flotation steps of claim 11 in which (a) mixed liquor from said treatment and flotation chamber is delivered to a settling tank where at least some of said solid particles settle to the tank floor to be withdrawn therefrom as settled sludge, (b) some of said settled sludge may be discharged from the plant as waste solids, and (c) more than one-half the total waste solids from the activated sludge sewage treatment installation as a whole is removed as floated sludge from said treatment and flotation chamber, and less than one-half said total waste solids from the installation as a whole is withdrawn from said settling tank.

13. The biological oxidation and flotation steps of claim 11 in which mixed liquor from said treatment and flotation chamber is delivered to a settling tank where at least some of said solid particles settle to the tank to be withdrawn therefrom as settled sludge and the only materials introduced into the inlet of said treatment and flotation chamber are the aqueous waste material to be treated in the apparatus, and settled sludge withdrawn from said settling tank floor for use as return activated sludge.

14. The biological oxidation and flotation steps of claim 11 in which mixed liquor from said treatment and flotation chamber is delivered to a settling tank where at least some of said solid particles settle to the tank to be withdrawn therefrom as settled sludge and the only materials introduced into the inlet of said treatment and flotation chamber are the aqueous waste material to be treated in the apparatus, floated sludge withdrawn from the top of said treatment and flotation chamber and returned to said inlet, and settled sludge withdrawn from said settling tank floor for use as return activated sludge.

15. The biological oxidation and flotation steps of claim 1 in which said upper quiescent zone extends laterally throughout said treatment and flotation chamber, so that the entire surface of the contents of said chamber is covered by said float of intermixed solid particles and gas bubbles.

16. The biological oxidation and flotation steps of claim 1 in which said upper quiescent zone is present only in the downstream part of said treatment and flotation chamber, so that the upstream part of said chamber is substantially free of any float on the surface of the aqueous waste material contained in said chamber.

17. The biological oxidation and flotation steps of claim 16 in which substantially all the bubbles introduced into the mixed liquor at least in the portions of said treatment and flotation chamber over which said upper quiescent zone lies are no more than about 200 microns in diameter at the point of their introduction into said mixed liquor.

18. The biological oxidation and flotation steps of claim 16 in which substantially all the bubbles introduced into the mixed liquor at least in the portions of said treatment and flotation chamber over which said upper quiescent zone lies are no more than about 100 microns in diameter at the point of their introduction into said mixed liquor.

19. The biological oxidation and flotation steps of claim 16 in which substantially all the bubbles introduced into the mixed liquor at least in the portions of said treatment and flotation chamber over which said upper quiescent zone lies are no more than about 50 microns in diameter at the point of their introduction into said mixed liquor.

20. The biological oxidation and flotation steps of claim 16 in which the gas bubbles introduced into said treatment and flotation chamber are air bubbles.

21. The biological oxidation and flotation steps of claim 16 in which the gas bubbles introduced into said treatment and flotation chamber are primarily oxygen, containing no more than about 20 percent by volume of other gases.

22. The biological oxidation and flotation steps of claim 16 in which said upper quiescent zone has a greater depth at its downstream end than at its upstream end, so that the float formed in said zone is thicker at its downstream end than it is at its upstream end.

23. The biological oxidation and flotation steps of claim 16 in which the mixed liquor is introduced into said treatment and flotation chamber at least about four feet below the surface of the contents of said chamber.

24. The biological oxidation and flotation steps of claim 16 in which the gas bubbles are introduced into the mixed liquor contained in said treatment and flotation chamber at a location below the inlet through which the mixed liquor is introduced into said chamber.

25. The biological oxidation and flotation steps of claim 16 in which the gas bubbles introduced into the mixed liquor at least in said recirculation zone in the downstream part of said treatment and flotation chamber are produced by employing a stream of liquid to achieve bubble shearing at a gas diffusing surface, substantially all of said bubbles thus produced being no more than about 500 microns in diameter at the point of their introduction into said body of liquid, said bubbles being introduced into said mixed liquor in said treatment and flotation chamber at a volumetric gas flow rate in the range from about 15 to about 70 cubic feet per minute for each square foot of active area of said gas diffusing surface.

26. The biological oxidation and flotation steps of claim 25 in which said stream of liquid shears gas bubbles from a plurality of capillary openings, and then flows into said body of liquid in the treatment and flotation chamber with said bubbles entrained therein.

27. The biological oxidation and flotation steps of claim 26 in which each of said liquid streams flows into said body of liquid along initial flow lines oriented at angles that are no more than about 30° above or below the horizontal.

28. The biological oxidation and flotation steps of claim 25 in which said stream of liquid is formed by pumping aqueous waste material from a level at least about three inches below the level to which said treatment and flotation chamber is filled with aqueous waste material.

29. The biological oxidation and flotation steps of claim 28 in which a plurality of streams of liquid is employed for producing gas bubbles to be introduced in said recirculation zone, said plurality of streams being formed by pumping mixed liquor from successive locations in the downstream direction in the part of said chamber over which said quiescent zone lies, the farthest upstream of said locations being at least about three inches below the surface of the contents of said chamber, and the farthest downstream of said successive locations being at a lower level than the farthest upstream of said locations in the flotation chamber, so that the depth of said upper quiescent zone in the flotation chamber increases in the downstream direction.

30. The biological oxidation and flotation steps of claim 25 in which said stream of liquid employed in producing the gas bubbles introduced into the upstream part of said chamber that is free of said quiescent zone is formed by pumping mixed liquor from a level no more than about two feet below the contents of said upstream part of the chamber, so that the contents of said part of the chamber are substantially continuously recirculated from top to bottom of said chamber.

31. The oxidation and flotation steps of claim 16 in which a portion of the floated sludge withdrawn from the top of said treatment and flotation chamber is returned to the inlet of said chamber.

32. The oxidation and flotation steps of claim 16 in which at least a portion of the floated sludge withdrawn from the top of said treatment and flotation chamber is diverted to a waste accumulating zone for further concentration in said latter zone.

33. The biological oxidation and flotation steps of claim 32 in which (a) mixed liquor from said treatment and flotation chamber is delivered to a settling tank where at least some of said solid particles settle to the tank floor to be withdrawn therefrom as settled sludge, (b) some of said settled sludge may be discharged from the plant as waste solids, and (c) more than one-half the total waste solids from the activated sludge sewage treatment installation as a whole is removed as floated sludge from said treatment and flotation chamber and less than one-half said total waste solids from the installation as a whole is withdrawn from said settling tank.

34. The biological oxidation and flotation steps of claim 1 in which the contents of said treatment and flotation chamber are free of any polymers added to said contents to encourage agglomeration of solids suspended therein to form larger and more easily floated floc particles.

35. The biological oxidation and flotation steps of claim 1 in which the step of introducing oxygen-containing gas bubbles into said treatment and flotation chamber is carried out by passing an oxygen-containing gas through a gas transmitting body having a labyrinthine network of gas transmitting passages therethrough terminating at a porous gas diffusing surface, separating gas bubbles from said surface, and introducing them into the surrounding liquid medium, substantially none of said bubbles is more than about 500 microns in diameter at the point of its introduction into said body of liquid, and said gas is passed through said gas transmitting body at a volumetric gas flow rate in the range from about 0.05 to about 2 cubic feet per minute for each square foot of active area of said gas diffusing surface.

36. The biological oxidation and flotation steps of claim 35 in which substantially none of said bubbles introduced into said treatment and flotation chamber is more than about 200 microns in diameter at the point of its introduction into the body of liquid in said chamber.

37. The biological oxidation and flotation steps of claim 35 in which the gas bubbles are separated from said porous gas diffusing surface through the operation of buoyant forces, substantially none of said bubbles is more than about 500 microns in diameter at the point of its introduction into said body of liquid, and the volumetric gas flow rate through said gas transmitting body falls in the range from about 0.05 to about 1 cubic foot per minute for each square foot of active area of said gas diffusing surface.

38. The biological oxidation and flotation steps of claim 37 in which substantially none of said bubbles introduced into said treatment and flotation chamber is more than about 200 microns in diameter at the point of its introduction into the body of liquid in said chamber.

39. The biological oxidation and flotation steps of claim 35 in which gas bubbles are separated from said porous gas diffusing surface through the operation of bubble shearing forces to cause bubbles to enter the surrounding liquid medium in said treatment and flotation chamber, substantially none of said bubbles is more than about 500 microns in diameter at the point of its introduction into said body of liquid, and the volumetric gas flow rate through said gas transmitting body falls in the range from about 0.1 to about 2 cubic feet per minute for each square foot of active area of said gas diffusing surface.

40. The biological oxidation and flotation steps of claim 39 in which substantially none of said bubbles introduced into said treatment and flotation chamber is more than about 200 microns in diameter at the point of its introduction into the body of liquid in said chamber.

41. The biological oxidation and flotation steps of claim 1 in which the step of introducing oxygen-containing gas bubbles into said treatment and flotation chamber is carried out by passing an oxygen-containing gas through a gas transmitting body having a plurality of substantially straight, unimpeded gas transmitting passages therethrough terminating at a porous gas diffusing surface, separating gas bubbles from said surface, and introducing them into the surrounding liquid medium, substantially none of said bubbles is more than about 500 microns in diameter at the point of its introduction into said body of liquid, and said gas is passed through said gas transmitting body at a volumetric gas flow rate in the range from about 1 to about 70 cubic feet per minute for each square foot of active area of said gas diffusing surface.

42. The biological oxidation and flotation steps of claim 41 in which substantially none of said bubbles introduced into said treatment and flotation chamber is more than about 200 microns in diameter at the point of its introduction into the body of liquid in said chamber.

43. The biological oxidation and flotation steps of claim 41 in which gas bubbles are separated from said porous gas diffusing surface through the operation of bubble shearing forces to cause bubbles to enter the surrounding liquid medium in said treatment and flotation chamber, substantially none of said bubbles is more than about 500 microns in diameter at the point of its introduction into said body of liquid, and the volumetric gas flow rate through said gas transmitting body falls in the range from about 3 to about 70 cubic feet per minute for each square foot of active area of said gas diffusing surface.

44. The biological oxidation and flotation steps of claim 43 in which substantially none of said bubbles introduced into said treatment and flotation chamber is more than about 200 microns in diameter at the point of its introduction into the body of liquid in said chamber.

45. The biological oxidation and flotation steps of claim 1 in which the step of introducing oxygen-containing gas bubbles into said treatment and flotation chamber is carried out by passing an oxygen-containing gas through a gas transmitting body having a plurality of gas transmitting passages therethrough terminating at a porous gas diffusing surface, separating gas bubbles from said surface through the operation of bubble shearing forces, and introducing said bubbles into the surrounding liquid medium, substantially none of said bubbles is more than about 500 microns in diameter at the point of its introduction into said body of liquid, and said gas is passed through said gas transmitting body at a volumetric gas flow rate in the range from about 0.1 to about 70 cubic feet per minute for each square foot of active area of said gas diffusing surface.

46. The biological oxidation and flotation steps of claim 45 in which substantially none of said bubbles introduced into said treatment and flotation chamber is more than about 200 microns in diameter at the point of its introduction into the body of liquid in said chamber.

47. In the treatment of aqueous waste material by the activated sludge process, said aqueous material containing solid particles suspended therein, the steps of biological oxidation of said waste material and removal therefrom of suspended solids by flotation which comprise:

introducing said aqueous waste material and return activated sludge into a treatment and flotation chamber, said chamber having (a) a quiescent zone in the upper portion thereof extending horizontally through at least the downstream part of said chamber, extending downward at least about three inches below the level to which the chamber is filled with mixed liquor comprised of said aqueous waste material and return activated sludge, and having a greater depth at its downstream end than at its upstream end, for accumulation and concentration of floated solids, and (b) a recirculation zone below said upper quiescent zone for continuous recirculation of the contents of said recirculation zone;

introducing a quantity of oxygen-containing gas bubbles into the lower portions of said mixed liquor in the treatment and flotation chamber, at least the bubbles introduced into the portion of said chamber over which said upper quiescent zone lies being introduced through the gas diffusing surface of a gas diffusing means at a pressure substantially the same as the hydrostatic pressure of the liquid at the point of introduction of said bubbles into said liquid, said latter bubbles being produced through bubble shearing employing at least one stream of liquid that shears gas bubbles from a plurality of capillary openings and then flows along initial flow lines oriented at angles that are no more than about 30° above or below the horizontal into said body of liquid with said bubbles entrained therein, a substantial portion of said latter bubbles being large enough to avoid total dissolution in said liquid in any region adjacent said point of introduction into said body of liquid, substantially all of said latter bubbles being no more than about 200 microns in diameter at said point of introduction, and said latter bubbles being introduced at a volumetric gas flow rate in the range from about 15 to about 70 cubic feet per minute for each square foot of active area of said gas diffusing surface in such quantity that (a) the initial velocity of liquid movement accompanying the introduction of said bubbles into the mixed liquor is low enough to permit said quiescent zone to be maintained in the upper portion of said chamber, (b) the oxygen provided by said bubbles that is absorbed by the mixed liquor produces biological oxidation of waste matter in said material, and (c) some of said bubbles, comprised in part of carbon dioxide resulting from said biological oxidation, attach themselves to some of said solid particles to form a float of intermixed solid sludge and gas bubbles, said float having a lower density than the aqueous medium in which said solid particles are suspended, said latter bubbles being produced through bubble shearing employing at least one stream of liquid that shears gas bubbles from a plurality of capillary openings and then flows along initial flow lines oriented at angles that are no more than about 30° above or below the horizontal into said body of liquid with said bubbles entrained therein;

continuously recirculating throughout any upstream part of said chamber that is free of said quiescent zone the mixed liquor that is located in said upstream part of said chamber;

continuously recirculating throughout said recirculation zone in at least the downstream part of said chamber the mixed liquor that is located in said recirculation zone by pumping said mixed liquor from a level at least about three inches below the surface of the contents of said treatment and flotation chamber to the bottom portion of said chamber, where said material is utilized to form said streams of liquid for bubble shearing;

withdrawing at least a portion of said floated sludge and gas bubbles from the top of said treatment and flotation chamber; and withdrawing said mixed liquor from the bottom portion of said treatment and flotation chamber to deliver it to a settling tank for settling of suspended particles in said tank.

48. In the treatment of aqueous waste material by the activated sludge process, said aqueous material containing solid particles suspended therein, the steps of biological oxidation of said waste material and removal therefrom of suspended solids by flotation which comprise:

introducing said aqueous waste material and return activated sludge into a biological oxidation tank to form mixed liquor;

dispersing a quantity of oxygen-containing gas bubbles through the lower portions of the mixed liquor in said biological oxidation tank to rise in said material and be absorbed thereby;

continuously recirculating the contents of said tank, including oxygen absorbed by said aqueous material and oxygen adsorbed by said solid particles, from the top portion of said tank to the bottom portion thereof;

transferring said mixed liquor from said biological oxidation tank to a treatment and flotation chamber, said chamber having (a) a quiescent zone in the upper portion thereof extending down at least about three inches below the level to which said chamber is filled with mixed liquor, for accumulation and concentration of floated solids, and (b) a recirculation zone below said upper quiescent zone for continuous recirculation of the contents of said recirculation zone, said material transferred from the biological oxidation tank being introduced into said recirculation zone;

introducing a quantity of oxygen-containing gas bubbles into the lower portions of the mixed liquor contained in said recirculation zone in said treatment and flotation chamber, said bubbles being produced directly from gas in the free state and being introduced through the gas diffusing surface of a gas diffusing means at a pressure substantially the same as the hydrostatic pressure of the liquid at the point of introduction of said bubbles into said liquid, a substantial portion of said bubbles being large enough to avoid total dissolution in said liquid in any region adjacent said point of introduction into said body of liquid, substantially all of said bubbles being no more than about 500 microns in diameter at said point of introduction, said bubbles being introduced at a volumetric gas flow rate that falls in the range from about 0.05 to about 120 cubic feet per minute for each square foot of active area of said gas diffusing surface in such quantity that (a) the initial velocity of liquid movement accompanying the introduction of said bubbles into the mixed liquor is low enough to permit said quiescent zone to be maintained in the upper portion of said chamber, (b) the oxygen provided by said bubbles that is absorbed by the mixed liquor produces biological oxidation of waste matter in said material, and (c) some of said bubbles, comprised in part of carbon dioxide resulting from said biological oxidation, attach themselves to some of said solid particles to form a float of intermixed solid sludge and gas bubbles, said float having a lower density than the aqueous medium in which said solid particles are suspended;

continuously recirculating throughout said recirculation zone the mixed liquor that is located in said zone;

withdrawing at least a portion of said floated sludge and gas bubbles from the top of said treatment and floation chamber; and withdrawing said mixed liquor from the bottom portion of said treatment and flotation chamber to deliver it to the next stage in said activated sludge process.

49. The biological oxidation and flotation steps of claim 48 in which the mixed liquor transferred from the biological oxidation tank is introduced into the treatment and flotation chamber at least about four feet below the level to which said chamber is filled with mixed liquor.

50. The biological oxidation and flotation steps of claim 48 in which said gas bubbles are introduced into the mixed liquor contained in the treatment and flotation chamber at a location below the inlet through which the mixed liquor is introduced into said chamber from said biological oxidation tank.

51. The biological oxidation and flotation steps of claim 48 in which said biological oxidation tank has a downstream wall that defines an outlet from the tank located at least about four feet below the level to which the tank is filled with mixed liquor, and said treatment and flotation chamber has an upstream wall that defines an inlet located below said upper quiescent zone in said chamber.

52. The biological oxidation and flotation steps of claim 48 in which said biological oxidation tank and said treatment and flotation chamber have a common wall therebetween, in the form of baffle means extending downward from the top of the tank and chamber to a level adjacent the bottom thereof, said baffle means and said bottom defining the outlet of the biological oxidation tank and the inlet of the chamber.

53. The biological oxidation and flotation steps of claim 48 in which the gas bubbles introduced into said biological oxidation tank and said treatment and flotation chamber are air bubbles.

54. The biological oxidation and flotation steps of claim 48 in which the gas bubbles introduced into said biological oxidation tank and said treatment and flotation chamber are primarily oxygen, containing no more than about 20 percent by volume of other gases.

55. The biological oxidation and flotation steps of claim 48 in which substantially all the bubbles introduced into the mixed liquor in said biological oxidation tank are no more than about 500 microns in diameter at the point of their introduction into said mixed liquor.

56. The biological oxidation and flotation steps of claim 48 in which substantially all the bubbles introduced into the mixed liquor in said biological oxidation tank are no more than about 200 microns in diameter at the point of their introduction into said mixed liquor.

57. The biological oxidation and flotation steps of claim 48 in which substantially all the bubbles introduced into said mixed liquor in the biological oxidation tank are no more than about 100 microns in diameter at the point of their introduction into said mixed liquor.

58. The biological oxidation and flotation steps of claim 48 in which substantially all the bubbles introduced into the mixed liquor in said biological oxidation tank are no more than about 50 microns in diameter at the point of their introduction into said mixed liquor.

59. The biological oxidation and flotation steps of claim 48 in which substantially all the bubbles introduced into the mixed liquor in said treatment and flotation chamber are no more than about 200 microns in diameter at the point of their introduction into said mixed liquor.

60. The biological oxidation and flotation steps of claim 48 in which substantially all the bubbles introduced into the mixed liquor in said treatment and flotation chamber are no more than about 100 microns in diameter at the point of their introduction into said mixed liquor.

61. The biological oxidation and flotation steps of claim 48 in which substantially all the bubbles introduced into the mixed liquor in said treatment and flotation chamber are no more than about 50 microns in diameter at the point of their introduction into said mixed liquor.

62. The biological oxidation and flotation steps of claim 48 in which the bubbles introduced into the mixed liquor in said biological oxidation tank are produced by employing a stream of liquid to achieve bubble shearing at a gas diffusing surface, substantially all of said bubbles thus produced being no more than about 500 microns in diameter at the point of their introduction into said body of liquid, said bubbles being introduced into said mixed liquor in said biological oxidation tank at a volumetric gas flow rate in the range from about 15 to about 70 cubic feet per minute for each square foot of active area of said gas diffusing surface.

63. The biological oxidation and flotation steps of claim 62 in which said stream of liquid shears gas bubbles from a plurality of capillary openings, and then flows into said body of liquid in the biological oxidation tank with said bubbles entrained therein.

64. The biological oxidation and flotation steps of claim 63 in which said stream of liquid is formed by pumping mixed liquor from a level no more than about two feet below the surface of the contents of said biological oxidation tank.

65. The biological oxidation and flotation steps of claim 48 in which the bubbles introduced into the mixed liquor in said treatment and flotation chamber are produced by employing a stream of liquid to achieve bubble shearing.

66. The biological oxidation and flotation steps of claim 65 in which said stream of liquid shears gas bubbles from a plurality of capillary openings, and then flows into said body of liquid in the biological oxidation tank with said bubbles entrained therein.

67. The biological oxidation and flotation steps of claim 66 in which each of said liquid streams employed in said bubble shearing flows into said body of liquid along initial flow lines oriented at angles that are no more than about 30° above or below the horizontal.

68. The biological oxidation and flotation steps of claim 66 in which said stream of liquid is formed by pumping mixed liquor from a level at least about three inches below the level to which said treatment and flotation chamber is filled with mixed liquor to the bottom portion of said chamber to form a stream of liquid there, so that the liquid is simultaneously utilized as the shearing liquid for said bubble shearing and recirculated within said recirculation zone, while said quiescent zone for the accumulation and concentration of floated sludge is maintained in the top portion of said chamber above said recirculation zone.

69. The biological oxidation and flotation steps of claim 48 in which a portion of said floated sludge withdrawn from the top of said treatment and flotation chamber is returned to the inlet of said biological oxidation tank.

70. The biological oxidation and flotation steps of claim 48 in which at least a portion of said floated sludge withdrawn from the top of said treatment and flotation chamber is diverted to a waste accumulating zone for further concentration in said latter zone.

71. The biological oxidation and flotation steps of claim 70 in which (a) mixed liquor from said treatment and flotation chamber is delivered to a settling tank where at least some of said solid particles settle to the tank floor to be withdrawn therefrom as settled sludge, (b) some of said settled sludge may be discharged from the plant as waste solids, and (c) more than one-half the total waste solids from the activated sludge sewage treatment installation as a whole is removed as floated sludge from said treatment and flotation chamber, and less than one-half said total waste solids from the installation as a whole is withdrawn from said settling tank.

72. The biological oxidation and flotation steps of claim 48 in which the step of introducing oxygen-containing gas bubbles into said biological oxidation tank is carried out by passing an oxygen-containing gas through a gas transmitting body having a plurality of gas transmitting passages therethrough terminating at a porous gas diffusing surface, separating gas bubbles from said surface through the operation of bubble shearing forces, and introducing said bubbles into the surrounding liquid medium, substantially none of said bubbles is more than about 500 microns in diameter at the point of its introduction into said body of liquid, and said gas is passed through said gas transmitting body at a volumetric gas flow rate in the range from about 0.1 to about 70 cubic feet per minute for each square foot of active area of said gas diffusing surface.

73. The biological oxidation and flotation steps of claim 72 in which substantially none of said bubbles introduced into said biological oxidation tank is more than about 200 microns in diameter at the point of its introduction into the body of liquid in said chamber.

74. The biological oxidation and flotation steps of claim 48 in which the step of introducing oxygen-containing gas bubbles into said separate biological oxidation tank is carried out by passing an oxygen-containing gas through a gas transmitting body having a labyrinthine network of gas transmitting passages therethrough terminating at a porous gas diffusing surface, separating gas bubbles from said surface, and introducing them into the surrounding liquid medium, substantially none of said bubbles is more than about 500 microns in diameter at the point of its introduction into said body of liquid, and said gas is passed through said gas transmitting body at a volumetric gas flow rate in the range from about 0.05 to about 2 cubic feet per minute for each square foot of active area of said gas diffusing surface.

75. The biological oxidation and flotation steps of claim 74 in which the gas bubbles introduced into said biological oxidation tank are separated from said porous gas diffusing surface through the operation of buoyant forces, substantially none of said bubbles is more than about 500 microns in diameter at the point of its introduction into said body of liquid, and the volumetric gas flow rate through said gas diffusing means falls in the range from about 0.05 to about 1 cubic foot per minute for each square foot of active area of said gas diffusing surface.

76. The biological oxidation and flotation steps of claim 74 in which the gas bubbles introduced into said biological oxidation tank are separated from said porous gas diffusing surface through the operation of bubble shearing forces to cause bubbles to enter the surrounding liquid medium, substantially none of said bubbles is more than about 500 microns in diameter at the point of its introduction into said body of liquid, and the volumetric gas flow rate through said gas diffusing means falls in the range from about 0.1 to about 2 cubic feet per minute for each square foot of active area of said gas diffusing surface.

77. The biological oxidation and flotation steps of claim 48 in which the step of introducing oxygen-containing gas bubbles into said biological oxidation tank is carried out by passing an oxygen-containing gas through a gas transmitting body having a plurality of substantially straight, unimpeded gas transmitting passages therethrough terminating at a porous gas diffusing surface, separating gas bubbles from said surface, and introducing them into the surrounding liquid medium, substantially none of said bubbles is more than about 500 microns in diameter at the point of its introduction into said body of liquid and said gas is passed through said gas transmitting body at a volumetric gas flow rate in the range from about 1 to about 70 cubic feet per minute for each square foot of active area of said gas diffusing surface.

78. The biological oxidation and flotation steps of claim 77 in which substantially none of said bubbles introduced into said biological oxidation tank is more than about 200 microns in diameter at the point of its introduction into the body of liquid in said tank.

79. The biological oxidation and flotation steps of claim 48 in which the step of introducing oxygen-containing gas bubbles into said biological oxidation tank is carried out by passing an oxygen-containing gas through a gas transmitting body having a plurality of substantially straight, unimpeded gas transmitting passages therethrough terminating at a porous gas diffusing surface, separating gas bubbles from said surface through the operation of bubble shearing forces, and introducing them into the surrounding liquid medium, substantially none of said bubbles is more than about 500 microns in diameter at the point of its introduction into said body of liquid and said gas is passed through said gas transmitting body at a volumetric gas flow rate in the range from about 3 to about 70 cubic feet per minute for each square foot of active area of said gas diffusing surface.

80. The biological oxidation and flotation steps of claim 79 in which substantially none of said bubbles introduced into said biological oxidation tank is more than about 200 microns in diameter at the point of its introduction into the body of liquid in said tank.

81. In the treatment of aqueous waste material by the activated sludge process, said aqueous material containing solid particles suspended therein, the steps of biological oxidation of said waste material and removal therefrom of suspended solids by flotation which comprise:
  introducing said aqueous waste material and return activated sludge into a biological oxidation tank to form mixed liquor;
  introducing a quantity of oxygen-containing gas bubbles into the lower portion of the mixed liquor in said biological oxidation tank to rise in said material and be absorbed thereby, substantially all of said bubbles being no more than about 200 microns in diameter at their point of introduction into said mixed liquor, said bubbles being produced through bubble shearing employing at least one stream of liquid that shears gas bubbles from a plurality of capillary openings in the gas diffusing surface of a gas diffuser and then flows into said body of liquid with said bubbles entrained therein, the volumetric gas flow rate through said gas diffuser falling in the range from about 15 to about 70 cubic feet per minute for each square foot of active area of said gas diffusing surface;
  continuously recirculating the contents of said biological oxidation tank, including oxygen absorbed by said aqueous material and oxygen adsorbed by said solid particles, by pumping mixed liquor, from a level no more than about two feet below the surface of the contents of said tank, to the bottom portion of the tank, where said mixed liquor is utilized to form said stream of liquid for bubble shearing;
  transferring said mixed liquor from said biological oxidation tank to a treatment and flotation chamber, said chamber having (a) a quiescent zone in the upper portion thereof extending downward at least about three inches below the level to which said chamber is filled with mixed liquor, for accumulation and concentration of floated solids, and (b) a recirculation zone below said upper quiescent zone for continuous recirculation of the contents of said recirculation zone, said material transferred from said biological oxidation tank being introduced into said recirculation zone;
  introducing a quantity of oxygen-containing gas bubbles into the lower portions of the mixed liquor contained in said recirculation zone in said treatment and flotation chamber, said bubbles being produced directly from gas in the free state and being introduced through the gas diffusing surface of a gas diffusing means at a pressure substantially the same as the hydrostatic pressure of the liquid at the point of introduction of said bubbles into said mixed liquor, a substantial portion of said bubbles being large enough to avoid total dissolution in said body of liquid in any region adjacent their point of introduction into said body of liquid, substantially all of said latter bubbles being no more than about 200 microns in diameter at said point of introduction, said bubbles being introduced at a volumetric gas flow rate from about 15 to about 70 cubic feet per minute for each square foot of active area of said gas diffusing surface in such quantity that (a) the initial velocity of liquid movement accompanying the introduction of said bubbles into the mixed liquor is low enough to permit said quiescent zone to be maintained in the upper portion of said chamber, (b) the oxygen provided by said bubbles that is absorbed by said mixed liquor produces biological oxidation of waste matter in said material, and (c) some of said bubbles, comprised in part of carbon dioxide resulting from said biological oxidation, attach themselves to some of said solid particles to form a float of intermixed solid sludge and gas bubbles, said float having a lower density than the aqueous medium in which said solid particles are suspended, said bubbles being produced through bubble shearing employing at least one stream of liquid that shears gas bubbles from a plurality of capillary openings in a porous gas diffusing surface and then flows along initial flow lines oriented at angles that are no more than about 30° above or below the horizontal into said body of liquid with said bubbles entrained therein;

continuously recirculating throughout said recirculation zone the mixed liquor that is located in said zone, by pumping mixed liquor from a level at least about three inches below the surface of the contents of said treatment and flotation chamber, to the bottom portion of said chamber where said mixed liquor is utilized to form said streams of liquid for bubble shearing;

withdrawing at least a portion of said floated sludge and gas bubbles from the top of said treatment and flotation chamber; and withdrawing said mixed liquor from the bottom portion of said treatment and flotation chamber to deliver it to the next stage in said activated sludge process.

* * * * *